US012801660B2

(12) United States Patent
Desnoyer et al.

(10) Patent No.: US 12,801,660 B2
(45) Date of Patent: Nov. 17, 2026

(54) INSECT SORTATION SYSTEM INCLUDING SORTATION DEVICES FOR DIRECTING MOSQUITOS TO AN OUTLET AFTER PASSING A DETECTOR

(71) Applicant: Google LLC, Mountain View, CA (US)

(72) Inventors: Mark Desnoyer, San Francisco, CA (US); Victor Criswell, Burlingame, CA (US); Josh Livni, Davis, CA (US); Yaniv Ovadia, Cambridge, MA (US); Peter Massaro, San Carlos, CA (US); Nigel Snoad, Woodside, CA (US); Dilip Krishnan, Arlington, MA (US); Yi Han, San Francisco, CA (US); Tiantian Zha, South San Francisco, CA (US)

(73) Assignee: Google LLC, Mountain View, CA (US)

( * ) Notice: Subject to any disclaimer, the term of this patent is extended or adjusted under 35 U.S.C. 154(b) by 316 days.

(21) Appl. No.: 18/651,983

(22) Filed: May 1, 2024

(65) Prior Publication Data

US 2024/0281466 A1 Aug. 22, 2024

Related U.S. Application Data

(63) Continuation of application No. 16/859,397, filed on Apr. 27, 2020, now Pat. No. 12,038,969.

(Continued)

(51) Int. Cl.

*G06F 16/55* (2019.01)
*G06F 18/24* (2023.01)

(Continued)

(52) U.S. Cl.

CPC .............. *G06F 16/55* (2019.01); *G06F 18/24* (2023.01); *G06N 3/045* (2023.01); *G06T 1/0014* (2013.01)

(58) Field of Classification Search

CPC ....... G06F 16/55; G06F 18/24; G06T 1/0014; G06N 3/045

See application file for complete search history.

(56) References Cited

U.S. PATENT DOCUMENTS 5,594,654 A 1/1997 Shuman et al.
7,496,228 B2 2/2009 Landwehr et al.

(Continued)

FOREIGN PATENT DOCUMENTS

CN 104850836 A 8/2015
CN 106997475 A 8/2017

(Continued)

OTHER PUBLICATIONS

AU Appl. No. 2023201944, Examination Report, Nov. 13, 2024, 3 pages.

(Continued)

*Primary Examiner* — Kenny A Cese

(74) *Attorney, Agent, or Firm* — Kilpatrick Townsend & Stockton LLP

(57) ABSTRACT

An insect sortation system is disclosed. The insect sortation system includes a pathway having a first end and a second end; a first outlet extending from the pathway adjacent to the second end; a second outlet extending from the pathway adjacent to the second end; a detector disposed adjacent to the pathway and configured to detect one or more characteristics of mosquitos passing by the detector; a shutter disposed within the pathway between the detector and the second end of the pathway; and one or more sortation devices configured to direct each mosquito of the mosquitos to at least one of the first outlet or the second outlet after passing by the detector.

20 Claims, 12 Drawing Sheets

Related U.S. Application Data

(60) Provisional application No. 62/843,080, filed on May 3, 2019.

(51) Int. Cl.

| | |
|---|---|
| ***G06N 3/045*** | (2023.01) |
| ***G06T 1/00*** | (2006.01) |

(56) References Cited

U.S. PATENT DOCUMENTS

| | | | |
|---|---|---|---|
| 7,849,032 | B1 | 12/2010 | Campos et al. |
| 8,025,027 | B1 | 9/2011 | Morales-Ramos et al. |
| 8,269,842 | B2 | 9/2012 | Wang et al. |
| 8,478,052 | B1 | 7/2013 | Yee et al. |
| 9,633,306 | B2 | 4/2017 | Liu et al. |
| 9,668,699 | B2 | 6/2017 | Georgescu et al. |
| 9,730,643 | B2 | 8/2017 | Georgescu et al. |
| 9,786,270 | B2 | 10/2017 | Senior et al. |
| 9,830,526 | B1 | 11/2017 | Lin et al. |
| 9,990,558 | B2 | 6/2018 | Lin et al. |
| 10,007,866 | B2 | 6/2018 | Criminisi et al. |
| 10,019,654 | B1 | 7/2018 | Pisoni |
| 10,278,368 | B1 | 5/2019 | Peeters et al. |
| 11,354,546 | B2 | 6/2022 | Criswell et al. |
| 11,794,214 | B2 | 10/2023 | Criswell et al. |
| 12,038,969 | B2 | 7/2024 | Desnoyer et al. |
| 2014/0289323 | A1 | 9/2014 | Kutaragi et al. |
| 2015/0030255 | A1 | 1/2015 | Wu et al. |
| 2017/0273290 | A1 | 9/2017 | Jay |
| 2017/0273291 | A1 | 9/2017 | Yoo et al. |
| 2017/0316281 | A1 | 11/2017 | Criminisi et al. |
| 2018/0084772 | A1 | 3/2018 | Peeters et al. |
| 2018/0114334 | A1 | 4/2018 | Desai et al. |
| 2018/0121764 | A1 | 5/2018 | Zha et al. |
| 2018/0206473 | A1 | 7/2018 | Massaro et al. |
| 2018/0279598 | A1 | 10/2018 | Hur et al. |
| 2019/0104719 | A1 | 4/2019 | Guo |
| 2020/0219262 | A1 | 7/2020 | Hsiao et al. |
| 2020/0281164 | A1 | 9/2020 | Lepek et al. |
| 2020/0349397 | A1 | 11/2020 | Criswell et al. |
| 2021/0329889 | A1* | 10/2021 | Lepek .................... A01K 29/00 |

FOREIGN PATENT DOCUMENTS

| | | | |
|---|---|---|---|
| CN | 106733701 | B | 5/2018 |
| GB | 2300480 | A | 11/1996 |
| WO | 2017201540 | A1 | 11/2017 |
| WO | 2018134829 | A1 | 7/2018 |
| WO | 2019008591 | A2 | 1/2019 |

OTHER PUBLICATIONS

Singapore Appl. No. 11202112149Q, Written Opinion, May 15, 2024, 11 pages.
Australia Appl. No. 2023201944, Examination Report, May 30, 2024, 4 pages.
U.S. Appl. No. 16/859,397, Final Office Action, May 17, 2023, 16 pages.
U.S. Appl. No. 16/859,397, Non-Final Office Action, Oct. 5, 2022, 15 pages.
U.S. Appl. No. 16/859,397, Non-Final Office Action, Dec. 6, 2023, 22 pages.
U.S. Appl. No. 16/859,397, Notice of Allowance, Mar. 29, 2024, 11 pages.
U.S. Appl. No. 16/859,405, Non-Final Office Action, Jul. 27, 2021, 18 pages.
U.S. Appl. No. 16/859,405, Notice of Allowance, Feb. 9, 2022, 5 pages.
U.S. Appl. No. 17/805,583, Non-Final Office Action, Feb. 27, 2023, 18 pages.
U.S. Appl. No. 17/805,583, Notice of Allowance, Jun. 21, 2023, 9 pages.
Australia Appl. No. 2020268184, First Examination Report, Apr. 1, 2022, 3 pages.
Australia Appl. No. 2020268184, Second Examination Report, Oct. 26, 2022, 4 pages.
Cheng et al., "3D Tracking Targets via Kinematic Model Weighted Particle Filter", 2016 IEEE International Conference on Multimedia and Expo (ICME), Available Online at: https://www.researchgate.net/publication/307436501_3D_tracking_targets_via_kinematic_model_weighted_particle_filter, Jul. 11-15, 2016, pp. 1-6.
China Appl. No. 202090000536.2, Office Action, Mar. 16, 2022, 4 pages.
Ding et al., "Automatic Moth Detection from Trap Images for Pest Management", Computers and Electronics in Agriculture, vol. 123, Feb. 24, 2016, 17 pages.
Dominican Republic Appl. No. 2021-0186, Office Action, Nov. 24, 2022, 8 pages.
Europe Appl. No. 20726615.6, Office Action, Jul. 24, 2023, 3 pages.
Europe Appl. No. 20727012.5, Office Action, Dec. 5, 2023, 10 pages.
Europe Appl. No. 20727012.5, Intent to Grant, Mar. 28, 2024, 9 pages.
Kumar et al., "Robust Insect Classification Applied to Real Time Greenhouse Infestation Monitoring", Available Online at: https://homepages.inf.ed.ac.uk/rbf/VAIB10PAPERS/kumarvaib.pdf, 2010, pp. 1-4.
Landwehr et al., "Logistic Model Trees", Machine Learning, vol. 59, Available Online at: https://link.springer.com/content/pdf/10.1007/s10994-005-0466-3.pdf, 2005, pp. 161-205.
Larios et al., "Automated Insect Identification Through Concatenated Histograms of Local Appearance Features: Feature Vector Generation and Region Detection for Deformable Objects", Machine Vision and Applications, vol. 19, No. 2, Mar. 2008, pp. 105-123.
International Appl. No. PCT/US2020/030127, International Search Report and Written Opinion, Nov. 20, 2020, 17 pages.
International Appl. No. PCT/US2020/030127, Invitation to Pay Additional Fees and, Where Applicable, Protest Fee, Sep. 4, 2020, 12 pages.
International Appl. No. PCT/US2020/030128, International Search Report and Written Opinion, Oct. 20, 2020, 24 pages.
International Appl. No. PCT/US2020/030128, Invitation to Pay Additional Fees and, Where Applicable, Protest Fee, Jul. 14, 2020, 18 pages.
Rustia et al., "A Real-time Multi-Class Insect Pest Identification Method Using Cascaded Convolutional Neural Networks", 9th International Symposium on Machinery and Mechatronics for Agriculture and Biosystems Engineering (ISMAB), May 28-30, 2018, pp. 1-6.
Singapore Appl. No. 11202109762S, Written Opinion, Apr. 21, 2022, 7 pages.
U.S. Appl. No. 16/859,397, Notice of Allowability, Jun. 20, 2024, 3 pages.
Dominican Republic Appl. No. 2021-0186, Office Action, Jul. 12, 2024, 7 pages.

* cited by examiner

INSECT SORTATION SYSTEM INCLUDING SORTATION DEVICES FOR DIRECTING MOSQUITOS TO AN OUTLET AFTER PASSING A DETECTOR

CROSS REFERENCE TO RELATED APPLICATIONS

The present application is a continuation of U.S. Non-provisional patent application Ser. No. 16/859,397 entitled "Predictive Classification of Insects" and filed on Apr. 27, 2020, which application claims the benefit of U.S. Provisional Patent Application No. 62/843,080 entitled "Predictive Classification Of Insects" and filed on May 3, 2019, the disclosures of which are hereby incorporated by reference in their entireties.

Additionally, the present application is related to U.S. Non-provisional patent application Ser. No. 16/859,405 entitled "Insect Singulation And Classification" filed concurrently, which claims the benefit of U.S. Provisional Patent Application No. 62/843,092 entitled "Insect Singulation And Classification" and filed on May 3, 2019, the disclosures of which are hereby incorporated by reference in their entireties.

BACKGROUND

As part of a Sterile Insect Technique (SIT) program, insects may be classified as male or female and selectively sterilized before being released into the wild. Such programs may be implemented to minimize or eliminate insect-borne diseases and/or to manage insect populations in certain areas. Depending on the program, classification and sterilization may be performed at one or more stages of insect development.

Existing approaches for classification are various. For example, some approaches have attempted to classify males and females using non-visual attributes, such as wing beat frequency. Other approaches have relied on visual attributes such as abdomen size and antennae. Visual approaches have typically relied on humans visually inspecting each insect (or a batch of insects) and determining whether the particular insect is male or female (or whether the batch includes females that could contaminate a batch of males).

BRIEF SUMMARY

Various examples are described including systems, methods, and devices relating to classifying insects using predictive models.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system, including: an imaging device configured to capture images of insects and a computing device in communication with the imaging device, and configured to at least: instruct the imaging device to capture an image that depicts at least a portion of the insect. The computing device is also configured to receive, from the imaging device, the image. The computing device is also configured to determine, using an industrial vision classifier: (i) a first classification of the image into at least one category based at least in part on features extracted from the image, and (ii) a first confidence measure corresponding to the first classification. The computing device is also configured to determine, using a machine learning classifier (i) a second classification of the image into the at least one category based at least in part on the image, and (ii) a second confidence measure corresponding to the second classification. The computing device is also configured to determine a third classification of the image based at least in part on the first confidence measure and the second confidence measure. Other embodiments of this aspect include corresponding computer systems, apparatus, and computer programs recorded on one or more computer storage devices, each configured to perform the actions of the methods.

One general aspect includes a computer-implemented method, including: receiving a sequence of images that each depict at least a portion of an insect. The computer-implemented method also includes determining, using an industrial vision classifier, a first classification of the sequence of images insect into at least one category. The computer-implemented method also includes determining a first confidence measure corresponding to the first classification. The computer-implemented method also includes, in the event the first confidence measure falls below a threshold, determining, using a machine learning classifier, a second classification of the sequence of images into the at least one category. The computer-implemented method also includes determining a second confidence measure corresponding to the second classification. The computer-implemented method also includes generating classification information relating to the insect based on the second confidence measure. Other embodiments of this aspect include corresponding computer systems, apparatus, and computer programs recorded on one or more computer storage devices, each configured to perform the actions of the methods.

One general aspect includes a system, including: an imaging device configured to capture images of insects, and a computing device in communication with the imaging device, and configured to at least instruct the imaging device to capture a sequence of images depicting at least a portion of an insect. The computing device is also configured to use a first predictive model to determine a first output corresponding to a first classification of a first image of the sequence of images, the first output including a confidence measure of the first classification. The computing device is also configured to generate classification information based at least in part on the first output. Other embodiments of this aspect include corresponding computer systems, apparatus, and computer programs recorded on one or more computer storage devices, each configured to perform the actions of the methods.

One general aspect includes one or more non-transitory computer-readable media including computer-executable instructions that, when executed by one or more computing systems, cause the one or more computing systems to receive a set of images depicting at least a portion of an insect. The instructions further cause the one or more computer systems to determine a first set of classifications for the set of images by at least inputting the set of images into a first predictive model, the first predictive model including a core deep neural network model. The instructions further cause the one or more computer systems to determine a first set of confidence measures for the first set of classifications. The instructions further cause the one or more computer systems to determine a second set of classifications for the set of images by at least inputting the first set of confidence measures into a second predictive model, the second predictive model including a recurrent neural network model. The instructions further cause the one or more computer systems to determine a second set of confidence measures for the second set of classifications. The instructions further cause the one or more computer systems to generate classification information based at least in part on the second set of confidence measures. Other embodiments of this aspect include corresponding computer systems, apparatus, and computer programs recorded on one or more computer storage devices, each configured to perform the actions of the methods.

One general aspect includes a computer-implemented method, including receiving a set of images depicting at least a portion of an insect. The computer-implemented method also includes determining a first classification for the set of images by least inputting the set of images into a first predictive model, the first predictive model including a core deep neural network model. The computer-implemented method also includes determining a set of features corresponding to the first classification. The computer-implemented method also includes determining a second classification for the set of images by at least inputting the set of features into a second predictive model, the second predictive model including a recurrent neural network model. The computer-implemented method also includes determining a second confidence measure for the second classification. The computer-implemented method also includes generating classification information based at least in part on the second confidence measure. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
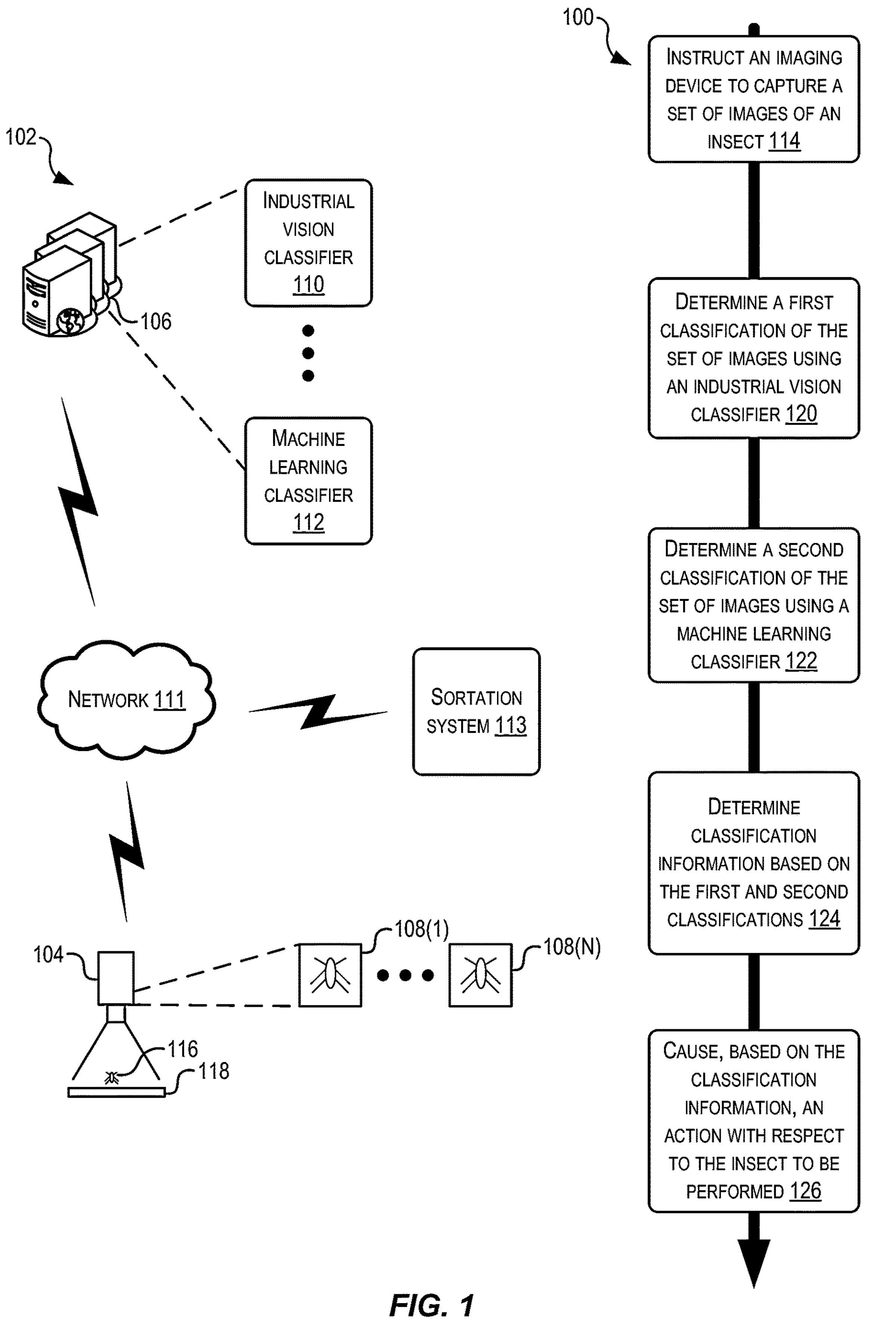
FIG. 1 illustrates a block diagram and a corresponding flowchart illustrating a process for classifying insects, according to at least one example.

Examples are described herein in the context of classifiers for use in classification of adult stage mosquitoes. Those of ordinary skill in the art will realize that the following description is illustrative only and is not intended to be in any way limiting. For example, the techniques described herein can be used to classify mosquitoes in other stages and/or other insects. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

In an illustrative example, an insect sorting system includes an imaging device and a classification module. The imaging device is used to capture images of the insects. The classification module classifies these images into at least one category (e.g., sex categories, species categories, etc.). Based on this classification, the insect can be sorted, e.g., the insect can be loaded into one of two compartments such as a non-female compartment (e.g., male, intersex, or gynandromorph) or a female compartment. This approach can be repeated to sort additional insects into one of the two compartments. The classification module can classify the images and output instructions for sorting the insects in about real time. For example, the insect sorting system includes an onramp from an insect holding area connected to narrow imaging path disposed within a field of view of the imaging device. The imaging path is connected to the two compartments. The insect sorting system also includes device(s) for singulating the insects (e.g., blowers, vacuums, trap doors, etc.) along the imaging path and sortation devices (e.g., blowers, vacuums, trap doors, etc.) to move insects from the imaging path to one of the compartments. Once an insect is singulated on the imaging path, the imaging device captures one or more images, which are then processed by the classification module to predict whether the insect on the path is female, male, intersex, or gynandromorph. Depending on this prediction and while the insect remains on the imaging path, one or more sortation devices are used to sort the insect into the appropriate compartment. In some examples, additional labels may be applied to the images such as, for example, number of mosquitoes or species of mosquito.

In some examples, the classification module can perform additional functionality beyond image classification. For example, the additional functionality of the classification module can be used to validate a previous classification performed by the classification functionality of the classification module. This can be performed at some later time, e.g., as part of quality control measure. For example, after the insect from above has been loaded into a compartment or at some other later time, the classification module can process the one or more images to confirm the earlier prediction. In a production system, the classification module can run on the same electronics as the imaging device (e.g., a phone, custom board, or other device) or it can run on a centralized set of servers that receive sequences of images from many imaging devices simultaneously and process the images at about the same time.

The classification module includes both an industrial vision classifier and a machine learning classifier. The industrial vision classifier is used to perform a first classification of an image of an insect. The machine learning classifier, which may include one or more predictive models, is used to perform a second classification of the image. The second classification may be based on the first classification or may be performed without regard to the first classification. In some examples, the industrial vision classifier performs the first classification at a first time and the machine learning classifier performs the second classification shortly thereafter such that the two classifications are used to make a single prediction. In some examples, the industrial vision classifier performs the first classification, from which a prediction is made, and the machine learning classifier validates the prediction as a quality control measure. For those classifications that do not meet some pre-determined level of confidence after the first and second classifications, the images are provided to one or more people for manual classification.

In some examples, the first predictive model is a core deep neural network model and the second predictive model is a recurrent neural network model that are connected in series. Thus, a sequence of images of an insect can be input into the first predictive model, and its output (e.g., features of the image and/or confidence measures for predictions) can be input into the second predictive model, which outputs second confidence measures for the sequence of images. This approach for classifying the sequence of images using the two predictive models may result in improved precision as compared to a single predictive model or a single industrial vision classifier. This approach also provides for get increased recall because the system allows the earlier classifiers to be a little more lenient, which will be balanced by the check on a different feature set. In particular, the system utilizes three different approaches for classification that each home in on different types of features. For instance, the industrial vision focuses on human understandable morphological features (e.g., an antenna shape), the core deep neural network model focuses on machine understandable statistically discriminatory static features, and the recurrent neural network focuses on picking up on motion/changes through time.

This illustrative example is given to introduce the reader to the general subject matter discussed herein and the disclosure is not limited to this example. The following sections describe various additional non-limiting examples techniques relating to using predictive models to classify insects.

Turning now to the figures, FIG. 1 illustrates a system 102 and a corresponding flowchart illustrating a process 100 for classifying insects, according to at least one example. The system 102 includes an imaging device 104 and a computing device 106. The imaging device 104, which may include any suitable combination of image sensors, lenses, computer hardware, and/or software, may be in network communication with the computing device 106. The imaging device 104 in this example captures images of insects 116 moving through an environment 118, such as a pathway, and outputs image data to the computing device 106, which receives the image data and performs an industrial vision technique to determine a classification for an insect. The imaging device 104 is configured to capture images at any suitable rate. In at least one example, the imaging device 104 capture images at a rate of about 5-10 frames per second. In other examples, the imaging device 104 captures images at a slower rate (e.g., less than 5 frames per second) or at a faster rate (e.g., faster than 5 frames per second).

The computing device 106, as described herein, is any suitable electronic device (e.g., personal computer, hand-held device, server computer, server cluster, virtual computer, etc.) configured to execute computer-executable instructions to perform operations such as those described herein. As described in additional detail with respect to FIG. 4, the computing device 106 can include a classification module, among other modules/components, that is configured to host an industrial vision classifier 110 and a machine learning classifier 112, and includes the functionality to perform the processes described herein.

Figure 2:
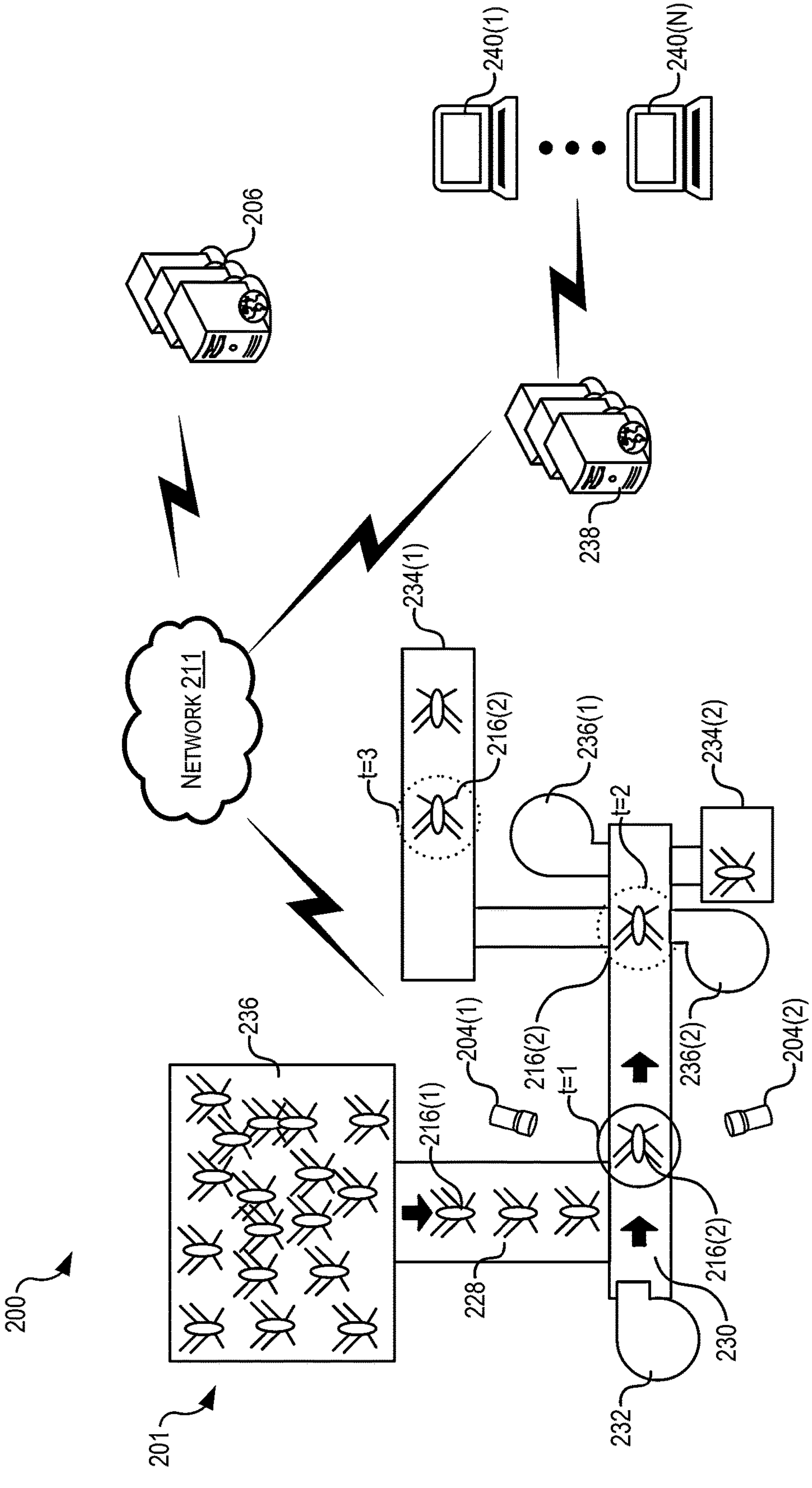
FIG. 2 illustrates an example system for separating insects based on a determined classification, according to at least one example.

The system 102 also includes a sortation system 113. The sortation system 113, as described in further detail with respect to FIG. 2, is a system for sorting insects based on a classification made by the computing device 106 based on images captured by the imaging device 104. In some examples, the imaging device 104 and the environment 118 are part of the sortation system 113. In this manner, insects can be imaged, classified, and sorted all within the sortation system 113.

The components of the system 102 are connected via one or more communication links with the network 111. The network 111 includes any suitable combination of wired, wireless, cellular, personal area, local area, enterprise, virtual, or other suitable network.

The process 100 illustrated in FIG. 1 provides an overview of how the system 102 may be employed to classify insects 116 moving through the environment 118. At block 114, the computing device 106 instructs the imaging device 104 to capture a set of images 108(1)-108(N of an insect 116. The imaging device 104 also generates metadata associated with each of the images 108 such as a timestamp of when the image 108 was taken and a unique image identifier. The ellipsis between the image 108(1) and the image 108(N) are used to designated that any suitable number of images may be included in this image set. Ellipses are used similarly throughout the figures. The images 108(1-N) depict the insect 116 within the environment 118. For example, as described in further detail with respect to FIG. 2, the insect 116 may be located within a pathway of an insect sortation system.

While in this example the computing device 106 instructs the imaging device 104 to capture the images 108, in some examples, the imaging device 104 captures the images 108 in a different manner, e.g., according to a fixed schedule (e.g., every five minutes), based on a trigger (e.g., after detecting movement in an insect population), or in any other suitable manner. The set of images 108(1-N) can also include a sequence of images (e.g., images taken of the same insect 116 at some fixed capture rate).

At block 120, the computing device 106 determines a first classification of the set of images 108 using the industrial vision classifier 110. As described in further detail with respect to later figures, the industrial vision classifier includes a computer vision system that is configured to classify objects present in images by extracting a set of features of the object from the image and applying a set of rules upon those features. The first classification of the set of images 108 represents a determination by the industrial vision classifier 110 that the insect 114 depicted in the images 108 belongs to one of one or more categories, e.g., a female category or non-female category (e.g., male, intersex, or gynandromorph). In some examples, the first classification also includes a confidence measure, e.g., a value between 0 and 1, that represents a likelihood that the classification is correct.

At block 122, the computing device 106 determines a second classification of the set of images 108 using the machine learning classifier 112. As described in further detail with respect to later figures, the machine learning classifier 112 includes one or more predictive models operating in parallel or in series that are trained to classify images of insects into one or more categories (e.g., female, male, intersex, and/or gynandromorph). The second classification of the set of images 108 represents a determination by the machine learning classifier 112 that the insect 114 depicted in the images 108 belongs to one of one or more categories. In some examples, the second classification also includes a confidence measure, e.g., a value between 0 and 1, that represents a likelihood that the second classification is correct. When the machine learning classifier 112 includes at least two predictive models, the confidence measures from these models may be combined to achieve higher confidence.

At block 124, the computing device 106 determines classification information based on the first and second classifications. In some examples, this includes combining the confidence measures from the two classifications to determine a composite classification. Thus, the classification information may include a composite confidence measure that is based on the confidence measures corresponding to the first classification and/or the second classification. In some examples, the classification information also includes other information output from the industrial vision classifier (e.g., features relied upon for the first classification) and/or the machine learning classifier (e.g., features relied upon for the second classification).

At block 126, the computing device 106 causes, based on the classification information, an action with respect to the insect to be performed. If the process 100 is performed to identify a category into which the insect 116 should be classified, the action can include causing the insect 116 to be physically moved into a container corresponding to the identified category. For example, as described in further detail with respect to FIG. 2, a sortation device such as an air nozzle or a trap door can be actuated to physically perform the action, e.g., move the insect into the container. If the process 100 is performed as part of a quality control/validation measure of previously sorted insects, (e.g., after the insects have been moved to the container based on a previously determined sex), the action can include releasing the insect 116 from the container if the process 100 determines a different category.

FIG. 2 illustrates a system 200 including an insect sortation system 201 (e.g., the sortation system 113) for separating insects based on a determined classification, according to at least one example. The insect sortation insect sortation system 201, which is illustrated in a simplified form, can be used to singulate, count, classify, and sort a population of insects. For example, the population of insects may include male insects, female insects, intersex insects, and gynandromorph insects. The insect sortation system 200 includes any suitable combination of chambers, paths, doors, and any other mechanical or electrical means to singulate the population of insects in a manner that enables counting, classifying, and sorting (e.g., physically moving to an appropriate container based on the classifying). These components of the insect sortation system 201 may be actuated by instructions provided by the computing device 206 over the network 211. In this manner, the computing device 106 may control the operation of the insect sortation system 201.

To achieve these purposes, the insect sortation system 201 includes a holding chamber 236 for holding an insect population. The insect population in the holding chamber 236 may include those of various sexes, various species, various sizes, and have any other varying characteristic. The techniques described herein may be used to classify insects of the insect population based on any one, or a combination of more than one, of these characteristics.

Insects 216 move in a route (identified by the directional arrows) from the holding chamber 236 to an onboarding ramp 228, onto a singulation pathway 230, and into one of a plurality of chambers 234. The insects 216 are singulated along this route so that only a single-file line of insects may move down the singulation pathway 230. In some examples, one or more mechanical singulation devices 232 are provided to physically move the insects 216 along their route. For example, such movement devices 232 may include blowers, vacuums, vibrators, agitators, conveyors, and the like that are configured to move the insects 216 along the route.

The insect sortation system 201 also includes one or more imaging devices 204(1)-204(N) in communication with, and in some examples, under the control of a computing device 206. The imaging devices 204 are configured to capture images of regions within the singulation pathway. Because insects move in a single-file line, the imaging devices 204 are configured to capture images of individual insects 216 as they move through the singulation pathway 230. For example, as illustrated in FIG. 2, the imaging devices 204 are configured to capture images of the insect 216(2). This can be performed at t=1. In some examples, the imaging devices 204 capture images of insect 216(2) as the insect 216(2) passes through multiple different positions along the singulation pathway 230. This may ensure that the images depict the insect 216(2) in different positions and orientations. In some examples, the images may be captured as video or in a sequence.

After the images have been captured by the imaging devices 204, the computing device 206 receives the images, e.g., as discrete images or as a continuous video feed having a defined frame rate, and uses the techniques described herein to classify the insect 216(2). For example, this can include using the classification module to analyze the images to predict a category to which the insect 216(2) should be assigned. Based on this classification, the insect 216(2) will then be assigned to one of chambers 234.

For example, as illustrated in FIG. 2 at t=2, the insect 216(2) has moved further along the singulation pathway 230. During this time, the computing device 206 has classified the insect 216(2) based on images received from one or more of the imaging devices 204. Based on this classification, the insect 216(2) can be moved into one of the chambers 234. For example, if the insect sortation system 201 were classifying and sorting insects 216 based on sex, the chamber 234(2) may include all insects 216 identified as female or for which a classification could not be determined and the chamber 234(1) may include all insects 216 identified as non-female. Such classification and sortation may be desirable for a SIT program that seeks to avoid releasing female insects. Other examples, however, may sort based on different characteristics, e.g., insect health, deformities, species, etc.

The insect sortation system 201 also includes sortation devices 236 to cause the insects 216 to be loaded into one of the chambers 234. For example, such devices can include blowers, sliding doors or floors, etc. As illustrated in FIG. 2 at t=3, the insect 216(2) has been loaded into the chamber 234(1). Based on the example from above, this may mean that the insect 216(2) was classified, at some point between t=1 and t=2, as a non-female insect.

The system 200 also includes a remote server 238 connected to the computing device 206 and/or the insect sortation system 201 via the network 211. The remote server 238 is communicably connected to one or more user terminals 240(1)-(N). In some examples, the user terminals 240 are used to by users to validate classifications of images captured by the imaging device 204. In some examples, the user terminals 240 are operated by a third-party service or may be personal user terminals, by which users access the images for validation. In some examples, the user terminals 240 are used to label training images for training the predictive models described herein.

Figure 3:
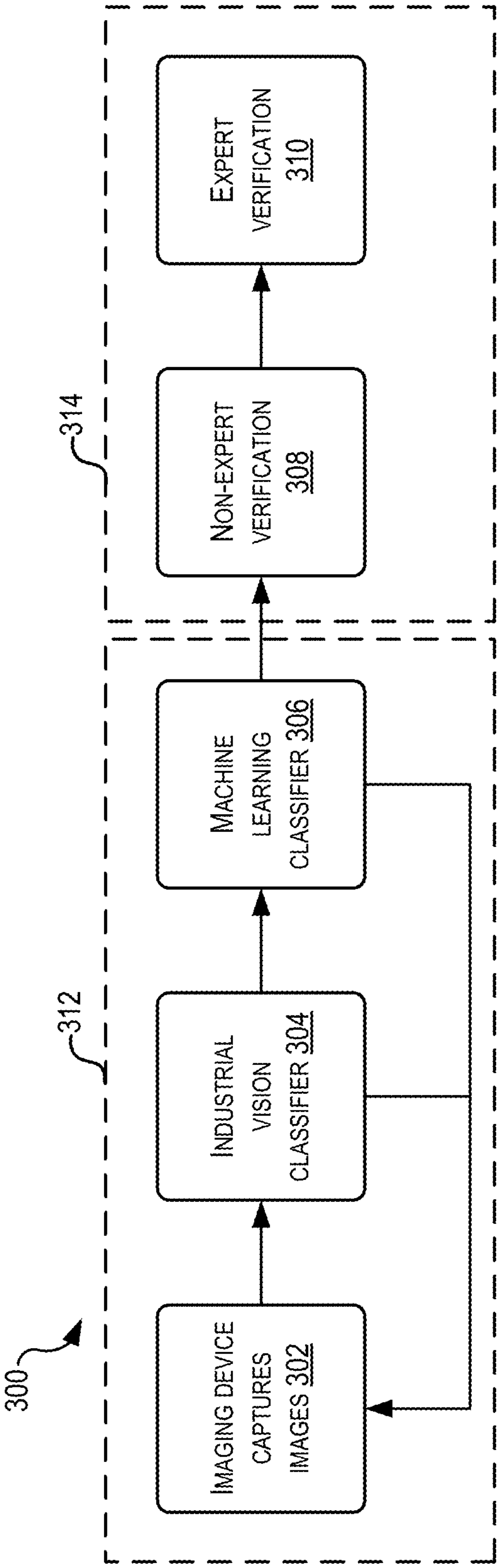
FIG. 3 illustrates an example flowchart illustrating a process for classifying insects, according to at least one example.

FIG. 3 illustrates an example flowchart illustrating a process 300 for classifying insects, according to at least one example. The process 300 represents a quality control pipeline that includes a primary portion 312 and an optional portion 314, each of which is implemented at various times between t=1 and t=3 shown in FIG. 2, depending on the application. The primary portion 312 in this example includes automated classification functionality, while the optional portion 314 includes manual classification operations that may be performed if the primary portion 312 is unable to arrive at a classification having a confidence level above a predetermined threshold.

Each of the blocks 304-310 use the images captured by the imaging device at block 302. Because each block 304-310 applies a different approach for classifying, the overall accuracy in a classification will likely increase. Depending on the implementation, a first set the blocks 304-310 are performed for classification and a second set of the blocks 304-310 are performed for quality control, such as to validate the classification(s).

In a particular use case, the primary portion 312 is used to make a classification. This can include, for example, an imaging device (e.g., 104) capturing images at block 302, an industrial vision classifier (e.g., 110) classifying the images at block 304, and a machine learning classifier (e.g., 112) classifying the images at block 306. Both the industrial vision classifier 110 and machine learning classifier 112 run in real-time from a sequence of images, e.g., a video captured by an imaging device. The two confidence scores are combined to create an overall classification that may be used for an immediate decision for those examples with a high confidence. The two classifiers 110 and 112 are built independently. As such, they are likely to make different mistakes.

Figure 4:
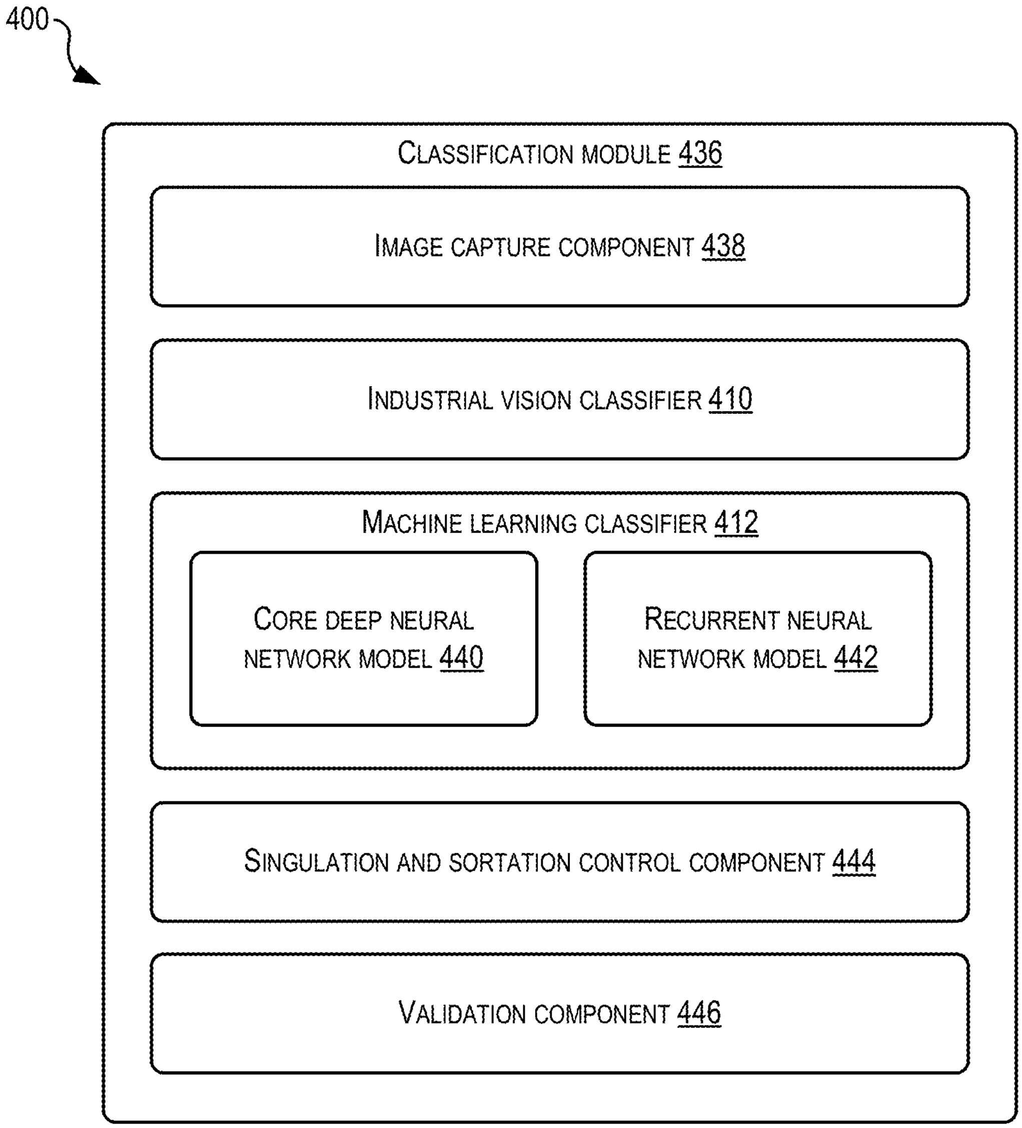
FIG. 4 illustrates an example device including a classification module for classifying insects, according to at least one example.

The industrial vision classifier 110, as described in detail with respect to FIG. 4 and used to classify at the block 304, may include any suitable system that can classify objects visually by extracting a set of features of the object and then applying a set of rules upon those features. For example, the industrial vision classifier 110 may include a feature detection algorithm that processes image pixels to determine whether there is a feature present at that pixel. Image features can include, for example, edges, corners, blobs, ridges and other similar features.

The machine learning classifier 112, as described in detail with respect to FIG. 4 and used to classify at the block 306, may be any suitable system that uses a large number of example images to statistically learn how to classify an image. For example, the machine learning classifier 112 may include a core deep neural network and/or a recurrent neural network. The more labeled images that are available and can be used to train the classifier 112, the more accurate such a system is likely to be. But because machine learning classifiers 112 operate in a fundamentally different manner from the industrial vision classifier 110, they are less likely to have correlated errors. This allows the two systems to be used together to produce an overall system that is more accurate.

In some examples, different combinations of the blocks 302-306 can be repeated if any one confidence measure or a composite confidence measure does not meet or exceed some predefined threshold. For example, if a first confidence measure output by the industrial vision classifier at the block 304 meets or exceeds the threshold, the process 300 may end. If the first confidence measure does not meet the threshold, a second confidence measure may be output by the machine learning classifier at the block 306. This second confidence measure can be combined with the first confidence measure to arrive at a composite confidence measure. If this second confidence measure alone or if the composite confidence measure does not meet the threshold, one or more blocks 308 or 310 of the optional portion 314 may be performed.

In some examples, each of the blocks in the primary portion 312 is used to classify and sort an insect (e.g., at t=1 to t=3). Thus, a classification may depend on output from both an industrial vision classifier and a machine learning classifier. For example, a cascade of classifiers can be used in which the subject image needs to path both classifiers independently. Ins some examples, a Naive Bayesian Optimal Classifier is used to combine the classification scores and uncertainties such that the combined classifier can trade off information from the industrial vision classifier and the machine learning classifier based on their confidences. This approach may be desirable because they system only needs to combine a small number of classifiers (e.g., 2 or 3). In this example, one or more blocks in the optional portion 314 can be used to validate the earlier classification and sortation at a later time (e.g., after 1-3). In other examples, block 302 and block 304 are used to classify and sort an insect. Thus, a classification may depend on output from just an industrial vision classifier, or on just a machine learning classifier. In some examples, using just one classifier may conserve computing resources and increase throughput as decisions about sorting can be made quicker than if two classifiers are running. If the classification depends only on the industrial vision classifier, the machine learning classifier and, in some examples, one or more blocks from the optional portion 314 can be used to validate the earlier classification and sortation.

The optional portion 314 can include non-expert verification at 308 and expert verification at 310. The optional portion 314 may be considered "optional" because it is typically performed after and, in some examples, only when the primary portion 312 is unable to determine a classification with a confidence level above a predetermined threshold. For example, if the system is sufficiently confident after performing the primary portion 312, the optional portion 314 of the process 300 may be disregarded. If, however, the system is not sufficiently confident, additional verification may be obtained using the block 308 and/or the block 310.

In some examples, if the industrial vision classifier and the machine learning classifier(s) combined are uncertain of the classification, e.g., the combined or individual confidence values are below a corresponding predetermined threshold, then the images are sent for human evaluation (e.g., non-expert verification at the block 308 and/or expert verification at the block 310). For example, the images can be sent to the remote server 238 and made available to the user terminals 240. Initially, the image can be sent to a panel of non-experts, e.g., over the network 211 to the remote server 238 and/or directly to a user terminal 240. These non-experts may be sourced using a micro task platform such as Amazon Turk® (or other set of organized or unorganized human users). For example, the remote server 238 may be configured to host the micro task platform. In such a platform, workers are paid a small amount for each classification performed. Results from these systems are usually available within a short period of time relative to the expert because there is a large pool of workers of whom some will always be available.

In some examples, to begin the process of classifying an image, each worker is presented with simplified instructions explaining how to differentiate the classes of objects present in the images. The workers are then shown examples of images and asked to categorize each image into one of the desired categories. Images with known classifications (e.g., labels) are also mixed in with the uncertain examples in a process known as salting. If the worker incorrectly identifies these salted images too often, then the worker is deemed to be of too low a quality to use and is prevented from doing further tasks.

Each uncertain image is examined by multiple workers in this example. If all of the workers agree, then the image may be determined to have that label. If one or more the workers disagree (or a threshold number of workers disagree), the image is sent to one or more experts to review, at the block 310.

Once the expert(s) receives the image, he or she may definitively identify the classification for the image. The experts that perform the expert verification may include those that are sourced based on qualifications and/or may be employed by the same entity that operates the insect sortation system 200. In some examples, the experts may use any suitable means to classify the image (e.g., visual inspection including magnification of the images).

FIG. 4 illustrates an example device 400 including a classification module 436 for classifying insects, according to at least one example. The device 400 includes any suitable combination of hardware, software, and/or firmware configured to implement the functionality described with reference to the classification module. Generally, the classification module 436 is configured to perform insect image classification 436, as described herein. To this end, the classification module 436 includes an image capture component 438, the industrial vision classifier 410, the machine learning classifier 412, a singulation and sortation control component 444, and a validation component 446. In some examples, the machine learning classifier 412 includes at least one of a core deep neural network model 440 and a recurrent neural network model 442

Turning now the image capture component 438, the image capture component 438 is configured to control the function of the imaging device 104. This may include instructing the image device 104 regarding when to capture images, how frequently, and the like. The image capture component 438 may store information (e.g., in the form of metadata) in association with the images. Such information can include timestamps, location data, build and version data, unique image identifiers, and the like.

The industrial vision classifier 410 is configured to access the images captured by the image capture component 438 (e.g., from memory and/or streaming from the imaging device 104). As introduced herein, the industrial vision classifier 410 may be configured to use object detection techniques to classify images including insects.

Initially, the object may be segmented from the background by subtracting the image taken by the imaging device shortly before the object is present. Then, features can be extracted from the segmented object. In some examples, these features may include, but are not limited to: size of the object, shape of the object, visual similarity to a known example, color of the object, texture of the object, the same type of features extracted from sub-regions of the object, and the same type of features extracted from successive images of the same object.

The features may be combined together using a manually designed set of rules, or they can be combined using a decision tree (e.g., Bayesian or boosted). Decision trees are lightweight machine learning algorithms that require less data to train to their maximum potential than a full machine learning classifier but can often achieve better performance than hand selected rules. The resulting trained decision tree may then be implemented as a sequence of if/then statements in any coding platform.

Figure 12:
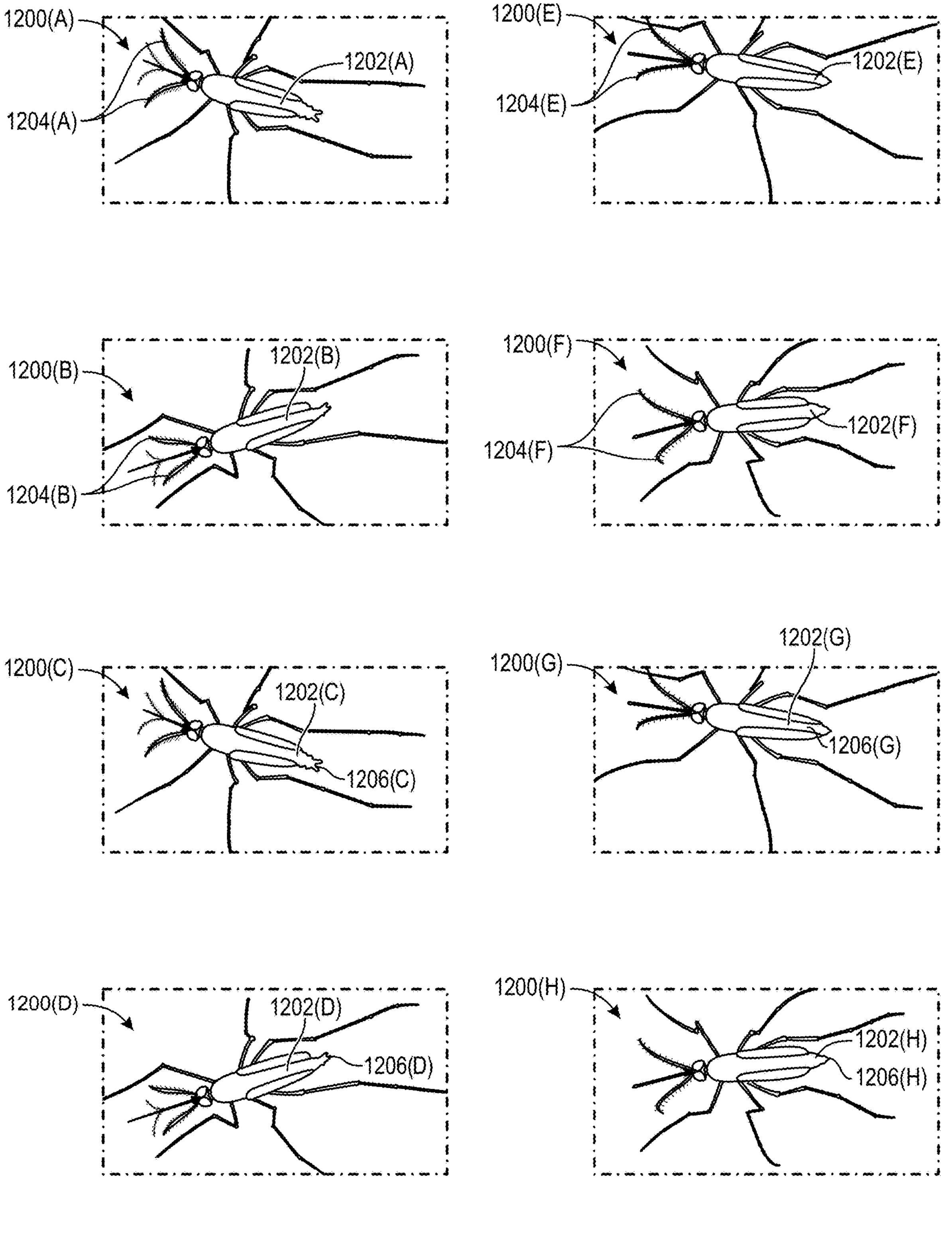
FIG. 12 illustrates example images of pairs of insects, according to at least one example.

In the particular implementation of the industrial vision classifier 410 that classifies mosquitoes based on sex (e.g., the insect sortation system 200), a mosquito walks in front of an imaging device (e.g., the imaging device 104) running at 5-10 frames per second. As described with respect to images 1200(A)-1200(H) FIG. 12, for each frame, the system looks for the mosquito's body 1202. If the body 1202 is found, then if the mosquito is too large, it is rejected as females are larger than males. See, for example, male mosquito bodies 1202(A)-1202(D) in images 1200(A)-1200(D) compared with female mosquito bodies 1202(E)-1202(H) in images 1200(E)-1200(H). If the body 1202 is small enough, then the system looks for bushy antennae 1204 of the males mosquito as well as identifying claspers 1206 at the rear. The antenna 1204(A) and 1204(B) of the males are much bushier than the antenna 1204(E) and 1204(F) of the females. The claspers 1206(C) and 1206(D) of the males are more dull and, in some examples, look like there are two distal structures as compared to the claspers 1206(G) and 1206(H) of the females. If the claspers are positively identified, the image is classified as male. If both antennae 1204 are found, then the image is also classified as male. For an insect to be classified as male in this example, all frames with a valid body 1202 found must be identified as male and at least three images must be used before the mosquito reaches a specific point along the lane. If not enough images are acquired, the mosquito is pushed back with air in order to acquire more images. The industrial vision classifier 410 then outputs a classification and a confidence. In other examples, different techniques, requirements, or thresholds may be used. For example, rather than requiring all frames to have an identifiable body, a lower threshold may be used. Similarly, a different threshold number of images than three may be employed.

Referring again to the machine learning classifier 412, it is configured to access the images captured by the image capture component 438 (e.g., from memory and/or streaming from the imaging device 104). As introduced herein, the machine learning classifier 412 may be configured to utilize one or more machine learning models to classify the images of the insects.

In some examples, the core deep neural network model 440 is one of the machine learning models implemented by the machine learning classifier 412. The core deep neural network model 440 is an object classification model for a single image. The core deep neural network model 440 uses the structure from a generic object classification model (e.g., Inception-v2) that processes a single still image. The core deep neural network model 440 takes as input a single still image and outputs a classification and a corresponding confidence measure and/or one or more features from the image that triggered the classification. This output from the core deep neural network model 440 can be used to classify the insect shown in the images, as described herein.

Before it may be used to classify insects, the machine learning classifier 412 must be trained. In order to train the core deep neural network model 440 of this example, a large number of training images are generated and labeled. These images are generated by having individual insects pass in front of an imaging device. As the insects pass in front, many images are taken and annotated as coming from the same insect. One of those images is labeled by humans and the label is copied to all other images in the sequence for training. This multiplies the number of training examples for the amount of labeling required.

The core deep neural network model 440 is trained using stochastic gradient descent and backpropagation in this example. In a SIT program, the training examples may be heavily male because pupae may be mechanically sex separated by size, removing most of the females before imaging of the adults would occur. This can bias the core deep neural network model 440 towards predicting the male class more regularly, which may not desired. So, the loss for every example can be reweighted to be proportional to the inverse of the label frequency. For example, when the core deep neural network model 440 is being trained, if the machine learning classifier 412 makes a mistake, a penalty proportional to the loss can be applied and, from this, that penalty can be back propagated through the core deep neural network model 440 so that the core deep neural network model 440 changes its internal weights (i.e. its model/understanding) a little bit to be more likely to get that example correct in the future. In some cases, especially when there are many similar examples, the core deep neural network model 440 can get very good at correctly classifying the examples but not so good at the rarer examples. To account for this, the loss of the rarer examples is changed so that these losses are penalized more and thus have more of an impact on the core deep neural network model 440. In this case, the inverse frequency is used for this, e.g., if there are 1000 male images and 100 female images, then the loss of getting a male wrong is 1/1000 and the loss from getting a female wrong is 1/100. The images that form the training data can be sent to a third-party service for labelling by human users. Once labelled, the images are received back and used as training data.

The core deep neural network model 440 can be initially trained as described above using dedicated training data (e.g., images that have been labeled by human users). The core deep neural network model 440, in some examples, is re-trained using data for the insects actually being classified. For example, images that have been validated using as part of the optional portion 314 of the process 300 may be fed back into the core deep neural network model 440 as training data.

In some examples, the machine learning classifier 412 also includes the recurrent neural network model 442 (e.g., a long term, short term memory network (LSTM)). The recurrent neural network model 442 may function on a sequence of inputs and contains some memory. It should be understood, however, that the techniques described herein may be implemented with any one of the recurrent neural network model 442 or the core deep neural network model 440. Combining the recurrent neural network model 442 with the core deep neural network model 440 may enable the classification module 436 to classify images with higher confidence measures.

The recurrent neural network model 442 is training on sequences of images and can therefore accept sequences of images for insect classification. The training sequences may have been captured for training the core deep neural network 440. Many training examples can be generated from a single sequence by using subsets of the sequence. This subset keeps the same ordering of images but by removing some images, the recurrent neural network model 442 will learn to be more robust to latency issues in production. Furthermore, a regularization term is added to the loss function equal to the sum of the uncertainty of the model at each step. This encourages the recurrent neural network model 442 to prefer a representation that allows it to make a determination more quickly.

In some examples, at least one of the core deep neural network model 440 or the recurrent neural network model 442 may be trained using an iterative bad label mining process. This process may operate on the property that a learning process will produce different versions of the predictive model in each run based on the images used for learning and on pure randomness. So, the predictive model can be trained many different times. Each time, a subset of the data can be selected and used to train the predictive model, and the model can be evaluated using the remaining data (e.g., the data that is left over after the subset is selected). Any examples that were incorrectly labeled are then re-examined by a human user and the label changed if appropriate. This approach can be iteratively repeated many times. Each time a different subset of the data can be selected and used to train the predictive model. Following, the remaining data (e.g., a different subset of the data) can be used for evaluating the predictive model. Performing this process can identify most incorrect labels. The resulting dataset will have a higher degree of accuracy and can be used to more tightly bound the error in the final model trained.

Turning now to the singulation and sortation component 444, this component is configured to control aspects of the system 200 relating to singulation and sortation. For example, the singulation sortation component 444 may control the operation of the singulation devices 232 and the sortation devices 236. Such control can include determining when to operate any one of the devices 232, 236 based on feedback from the imaging device 204 and/or other sensors present in the system 200 (e.g., proximity sensors, weight sensors, and the like configured to output information useable to determine a location of an insect within the system 200). For example, image data from the imaging device 204 can be used to determine which of the singulation devices 232 or the sortation devices 236 to actuate.

Turning now to the validation component 446, this component is configured to use output from one or more other components of the classification module 236 to generate a composite classification for one or more images. The validation component 446 combines output from the industrial vision classifier 410 (e.g., features and/or confidence measures) and output from the machine learning classifier 412 (e.g., confidence measures) to determine a composite confidence measure for a particular image or sequence of images. For example, the Naive Bayesian Optimal Classifier can be used to determine the likelihood of the distribution. This provides both a classification (e.g., maximum likelihood) and confidence (e.g., spread of the distribution).

In some examples, the validation component 436 is also configured to validate one or more classifications determined by the industrial vision classifier 410 and/or the machine learning classifier 412, in addition to validating the composite classification. For example, the validation component 436 is configured to provide images to remote users for validation (e.g., to the remote server 238).

Figure 5:
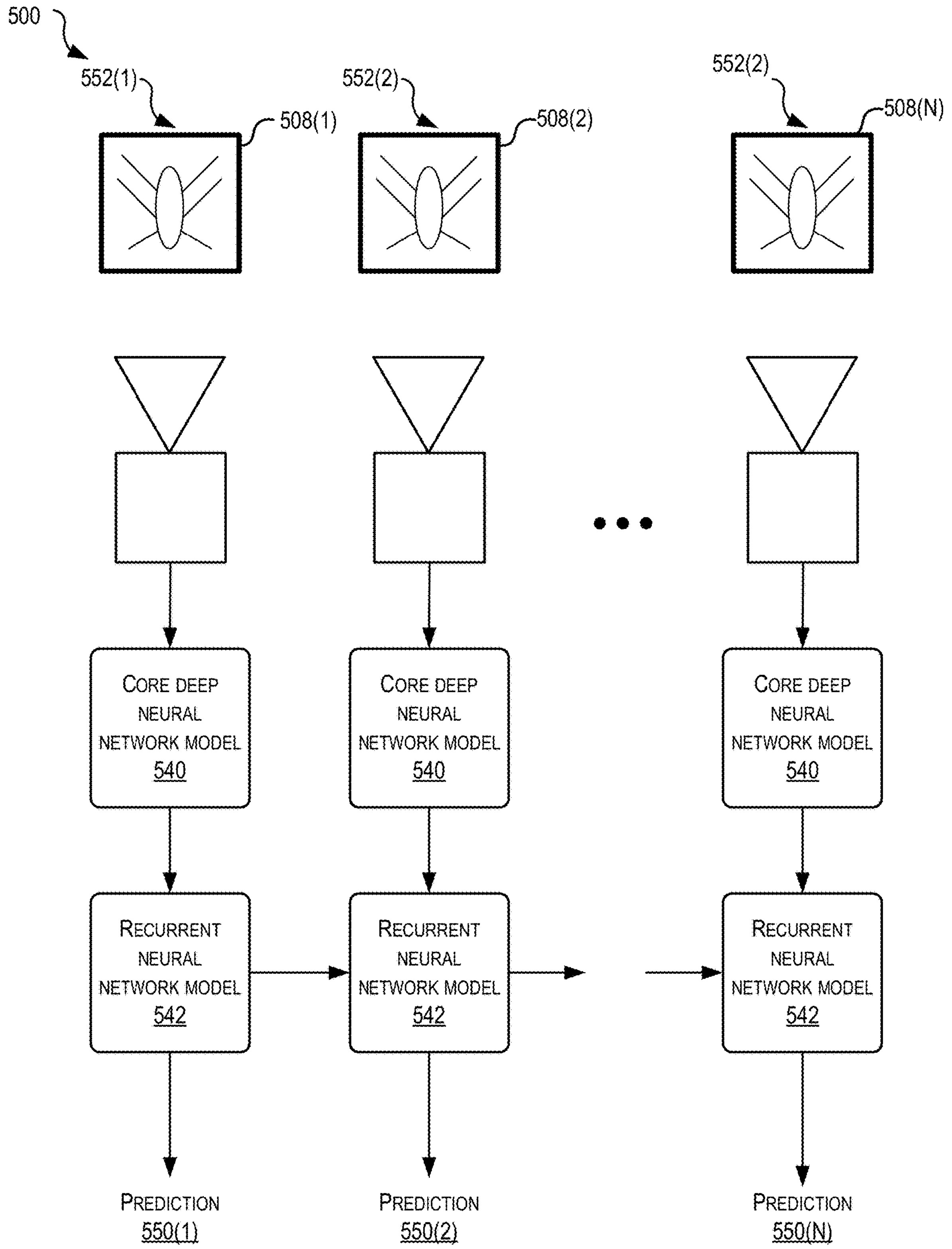
FIG. 5 illustrates an example diagram for implementing two predictive models for classifying insects, according to at least one example.

FIG. 5 illustrates an example diagram 500 implementing two predictive models for classifying insects, according to at least one example. The core deep neural network model 540 can be configured to incorporate multiple images of the same individual insect in two ways. A first way is to combine the estimated confidence measures using a Bayesian approach assuming that each measurement is independent and combining the confidence measures directly. For example, this can be achieved using Recursive Bayesian Estimation with no process model. Such an approach is equivalent to the Bayesian Optimal Classifier described herein but with an undefined number of measurements feeding the final prediction. Using this approach, the more measurements (i.e., images) that are sampled, the more confident the model becomes. A second way is described herein. This second approach includes feeding the output of the core deep neural network model 540 into the recurrent neural network model 542.

In this example, the output from the core deep neural network model 540 for a single image (e.g., confidence measure and/or features) provides the input for a single step in the recurrent neural network model 542. Sequences of images can be input into the recurrent neural network model 542 with their corresponding timestamps and outputs from the core deep neural network model 540. When a new insect is seen by the system, the recurrent neural network model 542 is reset. The system determines that a new insect is seen by, for example, detecting that the prior insect left one edge of the image and an insect appeared at the other edge. If multiple cameras are used, once an insect is visible in a second camera, an insect detected by the first camera is determined to be a new insect. Output from the recurrent neural network model 542 is a classification prediction 550 including corresponding confidence measure, e.g., a value between 0 and 1.

The diagram 500 graphically depicts a classification path 552 being traversed at successive times using different images. The classification path 552(1) represents the classification path 552 being traversed at a first time for a first image 508(1), the second classification path 552(2) represents the classification path 552 being traversed at a second time for a second image 508(2), and a N-th classification path represents the classification patch 552 being traversed for the N-th time for an N-th image 508(N). The images 508(1)-508(N) represent a sequence of images of the same insect. In some examples, the images 508 are not identical to each other.

Beginning with the first classification path 552(1), the first image 508(1) of the insect is input into the core deep neural network model 540. Output from the core deep neural network model 540 is used as input to the recurrent neural network model 542. The recurrent neural network model 542 uses this input and/or the image 508(1) to make a first prediction 550(1) for the image 508(1). The first prediction 550(1) corresponds to a first predicted classification for the image 508(1) and may be based on the classifications by the core deep neural network model 540 and the recurrent neural network model 542.

The second classification path 552(2) includes the second image 508(2) input into the core deep neural network model 540. Output from the core deep neural network model 540 based on the second image 508(2) is used as input to the recurrent neural network model 542 (e.g., at a different layer of the recurrent neural network model 542 than was used in the first classification path 552(1)). Additionally, output from the recurrent neural network model 542 when it evaluated the first image 508(1) is also used as input to the recurrent neural network model 542 in the second classification path 552(2). Second prediction 550(2) corresponds to a second predicted classification for the image 508(1) and may be based on the classifications by the core deep neural network model 540 and the recurrent neural network model 542. As shown with respect to the N-th classification path 552(N), this same process can be repeated for other images 508. The predictions 550 can be combined and/or compared in any suitable manner to determine whether the insect has been classified with a confidence level above a predetermined threshold and/or whether additional evaluation should be performed.

FIGS. 6-10 illustrate example flow diagrams showing processes 600, 700, 800, 900, and 1000, according to at least a few examples. These processes, and any other processes described herein (e.g., the process 100), are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

Figure 6:
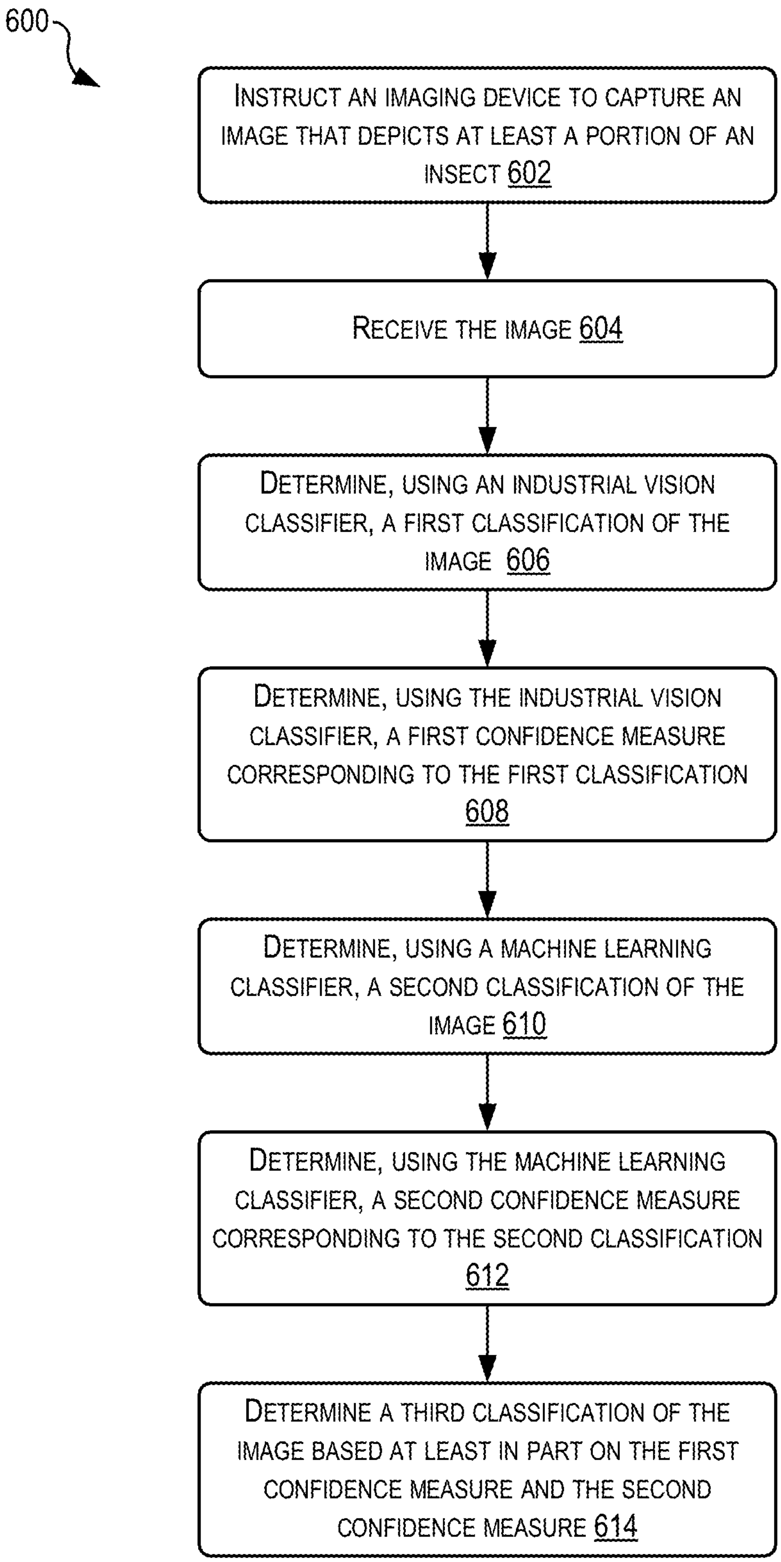
FIG. 6 illustrates an example a flow chart depicting an example process for classifying insects, according to at least one example.

FIG. 6 illustrates an example flow chart depicting the process 600 for classifying insects, according to at least one example. The process 600 is performed by the classification module 436 (FIG. 4) executing in the computing device 106 (FIG. 1). The process 600 in particular corresponds to using outputs from an industrial vision classifier and a machine learning classifier to classify an image.

The process 600 begins at block 602 by the computing device 106 instructing an imaging device (e.g., the imaging device 104) to capture an image that depicts at least a portion of an insect. In some examples, the image capture component 438 (FIG. 4) executing in the computing device 106 instructs the imaging device (e.g., the imaging device 104) to capture the image. The insect may be located at a first location within an environment when the imaging device captures the image. For example, the insect may be located on the singulation pathway 230 (FIG. 2).

At block 604, the process 600 includes the computing device 106 receiving the image. In some examples, the image capture component 438 executing in the computing device 106 receives and/or accesses the image from a memory device configured to store images. In other examples, receiving the image includes receiving a stream of images from the imaging device 104 (e.g., as a video stream).

At block 606, the process 600 includes the computing device 106 determining, using an industrial vision classifier (e.g., the industrial vision classifier 410 (FIG. 4)), a first classification of the image. In some examples, using the industrial vision classifier includes inputting the image into the industrial vision classifier and receiving the first classification as an output from the industrial vision classifier. The first classification may be a classification of the image into at least one category based at least in part on features extracted from the image by the industrial vision classifier.

At block 608, the process 600 includes the computing device 106 determining, using the industrial vision classifier, a first confidence measure corresponding to the first classification. In some examples, the industrial vision classifier 410 executing in the computing device performs the block 608. The first confidence measure may indicate a likelihood that the first classification is correct.

In some examples, the process 600 also includes instructing movement of the insect to a second location based at least in part on the first classification and the first confidence measure. For example, the insect can be moved from the first location (e.g., on the singulation pathway 234 (FIG. 2)) to the second location (e.g., within one of the chambers 234 (FIG. 2)).

At block 610, the process 600 includes the computing device 106 determining, using a machine learning classifier (e.g., the machine learning classifier 412 (FIG. 4)), a second classification of the image. In some examples, using the machine learning classifier includes inputting the image and/or output from the industrial vision classifier into the machine learning classifier. The second classification may be a classification of the image into at least one category.

In some examples, the block 610 is performed after the insect is located at the second location, as described above. In this example, the machine learning classifier can be used to validate that the insect was correctly classified and sorted (e.g., moved to the second location).

At block 612, the process 600 includes the computing device 106 determining, using the machine learning classifier, a second confidence measure corresponding to the second classification. The second confidence measure may indicate a likelihood that the second classification is correct.

At block 614, the process 600 includes the computing device 106 determining a third classification of the image based at least in part on the first confidence measure and the second confidence measure. In some examples, this may be performed by the validation component 446 (FIG. 4) executing in the computing device 106. This may include validating the first classification and the second classification.

In some examples, the process 600 further includes the computing device 106 instructing movement of the insect from the second location to a third location based at least in part on the third classification. For example, if the insect was misclassified and loaded into the incorrect chamber 234, the computing device 106 can generate an instruction to inform a user to remove the insect from the chamber 234 and/or empty the entire chamber 234. Thus, as described herein, the first location can be within an insect sortation device (e.g., the pathway 230), the second location can be within an insect transportation device (e.g., the chamber 234), and the third location is outside of the insect transportation device (e.g., released from the chamber 234).

In some examples, the insect is located at the first location while the imaging device captures the image and while the third classification of the image is determined. In this example, the process 600 may further include the computing device 106 instructing movement of the insect to a second location based at least in part on the third classification. For example, the movement from the pathway 230 (e.g., first location) into the chamber 234 (e.g., second location) may be based on the third classification In particular, instructing movement may include sending an instruction to a mechanical device to perform the movement. For example, the instruction may activate a blower for blowing the insect into the second location or open a trap door for the insect to fall in to the second location.

In some examples, the image includes a sequence of images, e.g., a video, and the first confidence measure includes a plurality of first confidence measures corresponding to individual images of the sequence of images. In this example, the second confidence measure includes a plurality of second confidence measures corresponding to the individual images of the sequence of images.

Figure 7:
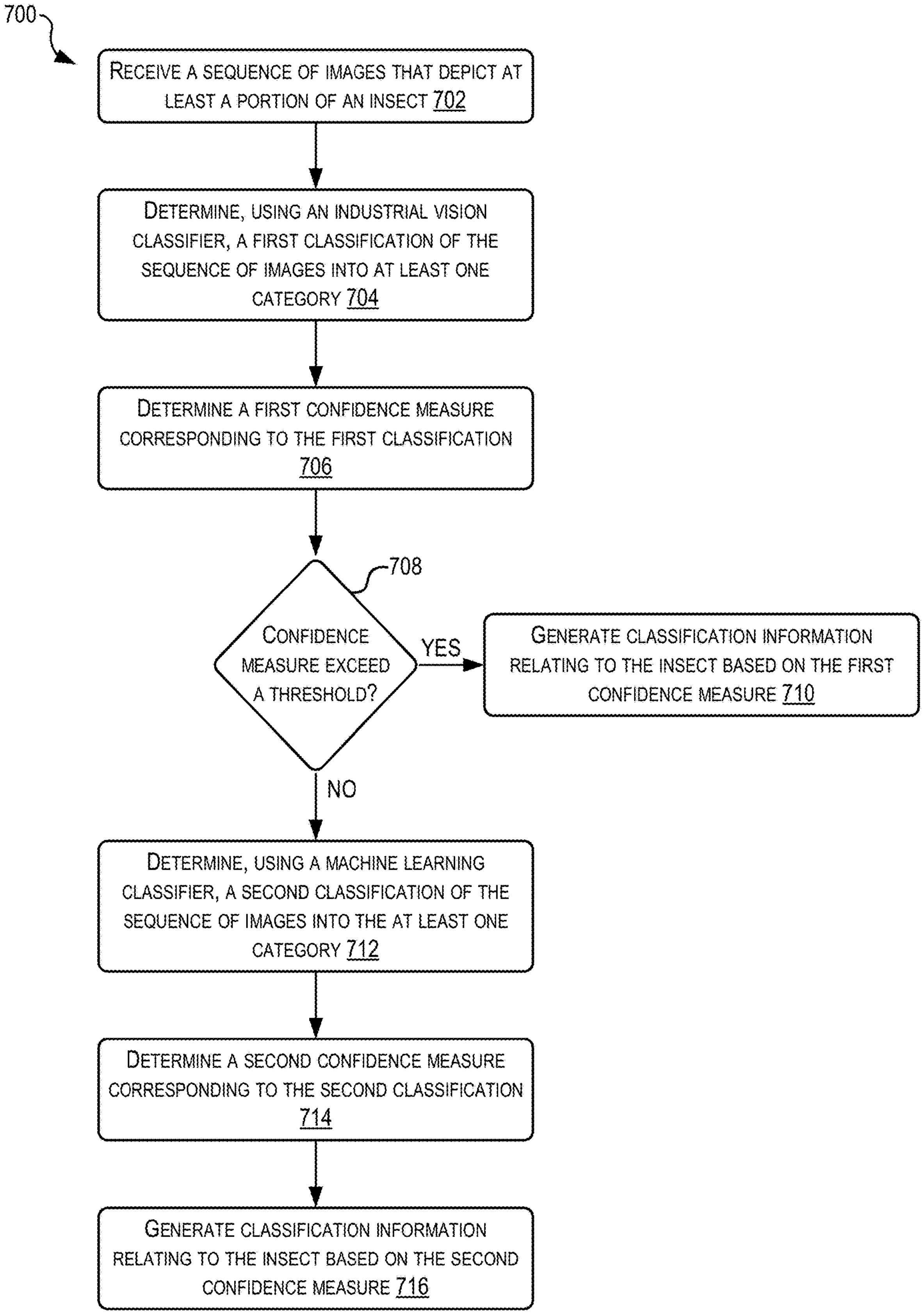
FIG. 7 illustrates an example a flow chart depicting an example process for classifying insects, according to at least one example.

FIG. 7 illustrates an example flow chart depicting the process 700 for classifying insects, according to at least one example. The process 700 is performed by the classification module 436 (FIG. 4) executing in the computing device 106 (FIG. 1). The process 700 in particular corresponds to using a machine learning classifier to classify a sequence of images when an industrial vision classifier fails to confidently classify the images.

The process 700 begins at block 702 by the computing device 106 receiving a sequence of images that each depict at least a portion of an insect. The image capture component 438 (FIG. 4) executing in the computing device 106 may receive the sequence of images generally as discussed above with respect to block 604.

At block 704, the process 700 includes the computing device 106 determining, using an industrial vision classifier, a first classification of the sequence of images insect into at least one category. The industrial vision classifier 410 (FIG. 4) may determine the first classification generally as discussed above with respect to block 606.

At block 706, the process 700 includes the computing device 106 determining a first confidence measure corresponding to the first classification. The industrial vision classifier 410 may determine the first confidence measure generally as discussed above with respect to block 608.

At block 708, the process 700 includes the computing device 106 determining whether the first confidence measure exceeds a confidence threshold. The validation component 446 (FIG. 4) executing in the computing device 106 may determine whether the first confidence measure exceeds the confidence threshold. The confidence threshold may be an fixed number (e.g., 10%, 20%, 30%, 40%, 50%, 60%, 70%, 80%, 90%, and any other suitable number not explicitly listed herein), selected based on heuristics, and/or determined in any other way (e.g., arbitrarily selected by a human user). In some examples, the confidence threshold increases proportionally with respect to the number of images in the sequence. For example, if the sequence includes as single image, the threshold may be 80%. If the sequence includes two images, the threshold may be increased to 82%.

If the determination at block 708 is YES, the process 700 proceeds to block 710, at which, the process 700 includes the computing device 106 generating classification information relating to the insect based on the first confidence measure. The validation component 446 executing in the computing device 106 may generate the classification information. In this example, the classification information, which may include a determined classification for the images, any corresponding confidence measure(s), and any other information relating to the classification, may be generated based solely on output from the industrial vision classifier.

If the determination at block 708 is NO, the process 700 proceeds to block 712, at which, the process 700 includes the computing device 106 determining, using a machine learning classifier, a second classification of the sequence of images into the at least one category. The machine learning classifier 412 (FIG. 4) may determine the second classification generally as discussed above with respect to block 610. The process 700 proceeds to block 710 if the first confidence measure falls below the threshold.

At block 714, the process 700 includes the computing device 106 determining a second confidence measure corresponding to the second classification. The machine learning classifier 412 may determine the second confidence measure generally as discussed above with respect to block 612. In some examples, the second confidence measure is based on output from a first predictive model and/or a second predictive model, e.g., the core deep neural network model 440 and/or the recurrent neural network model 442.

In some examples, the first predictive model outputs a first output that includes at least one of a first set of confidence measures corresponding to the sequence of images or a first set of features corresponding to the sequence of images. The second predictive model takes as input at least one of the first set of confidence measures or the first set of features, and outputs a second set of confidence measures corresponding to the sequence of images. In this example, determining the second confidence measure includes determining the second confidence measure based at least in part on the second set of confidence measures.

At block 716, the process 700 includes the computing device 106 generating classification information relating to the insect based on the second confidence measure. The validation component 446 executing in the computing device 106 may determine the classification information. In some examples, generation of the classification information is also based at least in part on the first confidence measure. In some examples, the classification information is associated with the insect and includes an instruction to either move the insect or refrain from moving the insect from a particular location.

In some examples, the process 700 may further include providing the sequence of images to a plurality of user devices for classification of the sequence of images by a plurality of non-expert users associated with the plurality of user devices. This approach is described further with respect to block 308 (FIG. 3) of the process 300.

In some examples, the process 700 may further include providing the sequence of images to at least one user device for classification of the sequence of images by at least one expert user associated with the at least one user device. This approach is described further with respect to block 310 (FIG. 3) of the process 300.

Figure 8:
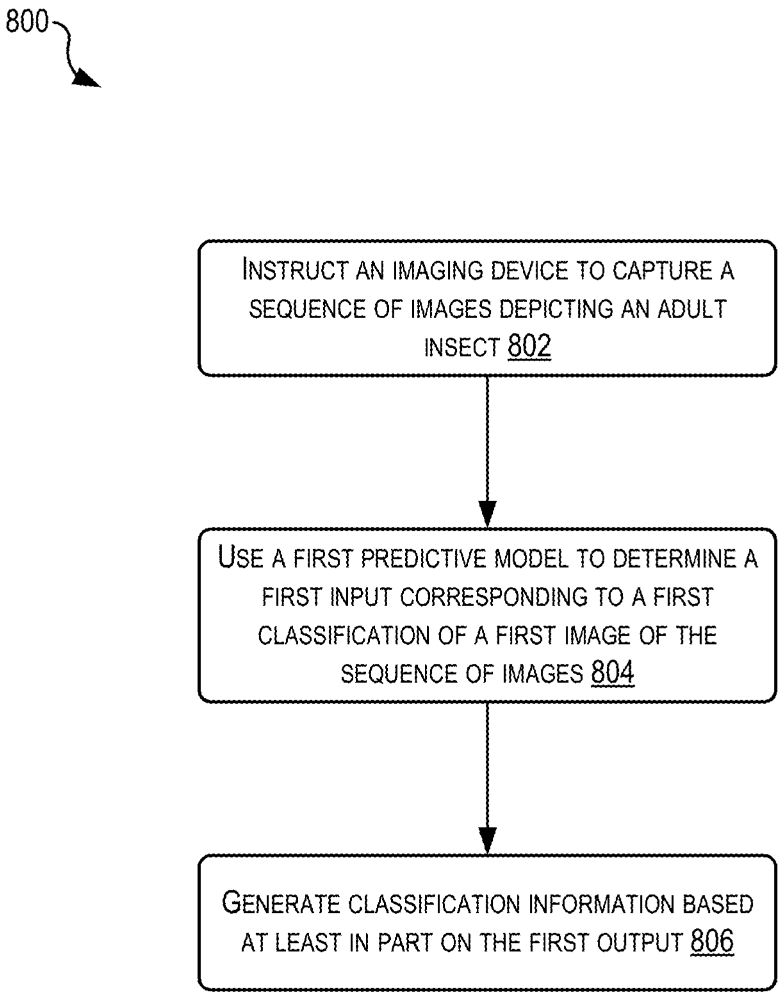
FIG. 8 illustrates an example a flow chart depicting an example process for classifying insects, according to at least one example.

FIG. 8 illustrates an example flow chart depicting the process 800 for classifying insects, according to at least one example. The process 800 is performed by the classification module 436 (FIG. 4) executing in the computing device 106 (FIG. 1). The process 800 in particular corresponds to using a machine learning classifier to classify a sequence of images.

The process 800 begins at block 802 by the computing device 106 instructing an imaging device to capture a sequence of images depicting at least a portion of an insect. The image capture component 438 (FIG. 4) executing in the computing device 106 instructs the imaging device to capture the sequence of images generally as discussed above with respect to block 602.

At block 804, the process 800 includes the computing device 106 using a first predictive model to determine a first output corresponding to a first classification of a first image of the sequence of images. The machine learning classifier 412 may determine the first output. For example, the predictive model may be the core deep neural network model 440. In other examples, the predictive model may be the recurrent neural network model 442. In either case, the first output includes a confidence measure of the first classification.

At block 806, the process 800 includes the computing device 106 generating classification information based at least in part on the first output. The validation component 446 (FIG. 4) may generate the classification information generally as discussed above.

In some examples, the process 800 further includes the computing device 106 using a second predictive model to determine a second output corresponding to a second classification of the sequence of images based at least in part on the first output from the first predictive model. For example, the output from the first predictive model may be input into the second predictive model. The second predictive model, in this example, may be the recurrent neural network model 442 (FIG. 4). In this example, generating the classification information may further be based at least in part on the second output.

In some examples, the second predictive model is trained using multiple subsets of multiple sequences of labeled images. In this example, each sequence of the multiple sequences may depict a different insect. In some examples, the sequence of images may include a set of chronological images of the insect.

In some examples, the process 800 further includes the computing device 106 using the first predictive model to determine a second output corresponding to a second classification of a second image of the sequence of images. In this example, the second output may include a second confidence measure of the second classification. In this example, the process 800 further includes the computing device 106 using a second predictive model to determine a set of third outputs corresponding to third classification of the sequence of images based at least in part on the first output and the second output from the first predictive model. In this example, generating the classification information may be further based at least in part on the third output.

In some examples, the classification information identifies a category to which the first classification corresponds. In this example, the process 800 further includes the computing device 106 instructing the imaging device to capture an additional set of images when the confidence measure fails to meet a confidence threshold for the category, using the first predictive model to determine a second output corresponding to a second classification of one or more images of the additional set of images, the second output including an additional confidence measure of the second classification, and generating updated classification information based at least in part on the second output.

Figure 9:
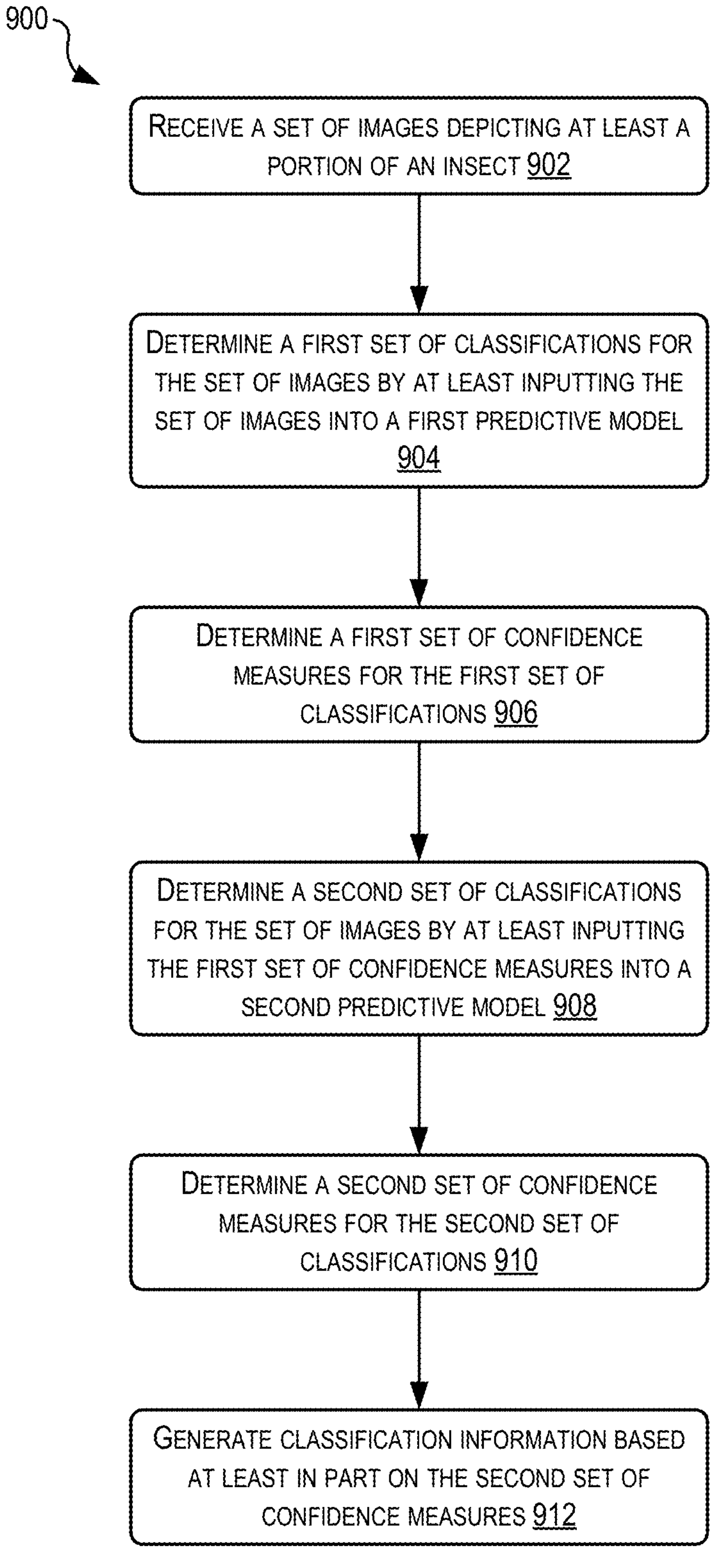
FIG. 9 illustrates an example a flow chart depicting an example process for classifying insects, according to at least one example.

FIG. 9 illustrates an example flow chart depicting the process 900 for classifying insects, according to at least one example. The process 900 is performed by the classification module 436 (FIG. 4) executing in the computing device 106 (FIG. 1). The process 900 in particular corresponds to using two predictive models to classify a set of images.

The process 900 begins at block 902 by the computing device 106 receiving a set of images depicting at least a portion of an insect. The image capture component 438 (FIG. 4) executing in the computing device 106 may receive the set of images, generally as discussed above with respect to block 602.

At block 904, the process 900 includes the computing device 106 determining a first set of classifications for the set of images by at least inputting the set of images into a first predictive model. The machine learning classifier 412 (FIG. 4) using the core deep neural network model 440 (FIG. 4) may determine the first set of classifications. For example, the first predictive model may be the core deep neural network model 440.

In some examples, the first predictive model may be trained by at least:

(i) identifying a subset of labeled training images;

(ii) using the subset of the labeled training images to train a version of the first predictive model;

(iii) classifying remaining labeled training images into at least one category;

(iv) identifying which labeled training images were misclassified; and (v) updating labeling of the misclassified labeled training images;

iteratively repeating (i) through (v) for different subsets of labeled training images and different remaining labeled training images.

At block 906, the process 900 includes the computing device 106 determining a first set of confidence measures for the first set of classifications. The machine learning classifier 412 may determine the first set of confidence measures by taking the images as inputs to the machine lea.

At block 908, the process 900 includes the computing device 106 determining a second set of classifications for the set of images by at least inputting the first set of confidence measures into a second predictive model. The machine learning classifier 412 using the recurrent neural network model 442 (FIG. 4) may determine the second set of classifications. Thus, the second predictive model at block 908 may be the recurrent neural network model 442. In some examples, each confidence measure of the first set of confidence measures is input into a different layer of the recurrent neural network.

At block 910, the process 900 includes the computing device 106 determining a second set of confidence measures for the second set of classifications. The machine learning classifier 412 may determine the second set of confidence measures, generally as described above.

At block 912, the process 900 includes the computing device 106 generating classification information based at least in part on the second set of confidence measures. The validation component 446 (FIG. 4) executing in the computing device 106 may determine the classification information. In some examples, the classification information may include a prediction that the insect depicting in the set of images is at least one of a male insect, a female insect, an intersex insect, or a gynandromorph insect. In some examples, the classification information may include an instruction for moving the insect from a particular location or to refrain from moving the insect from the particular location.

Figure 10:
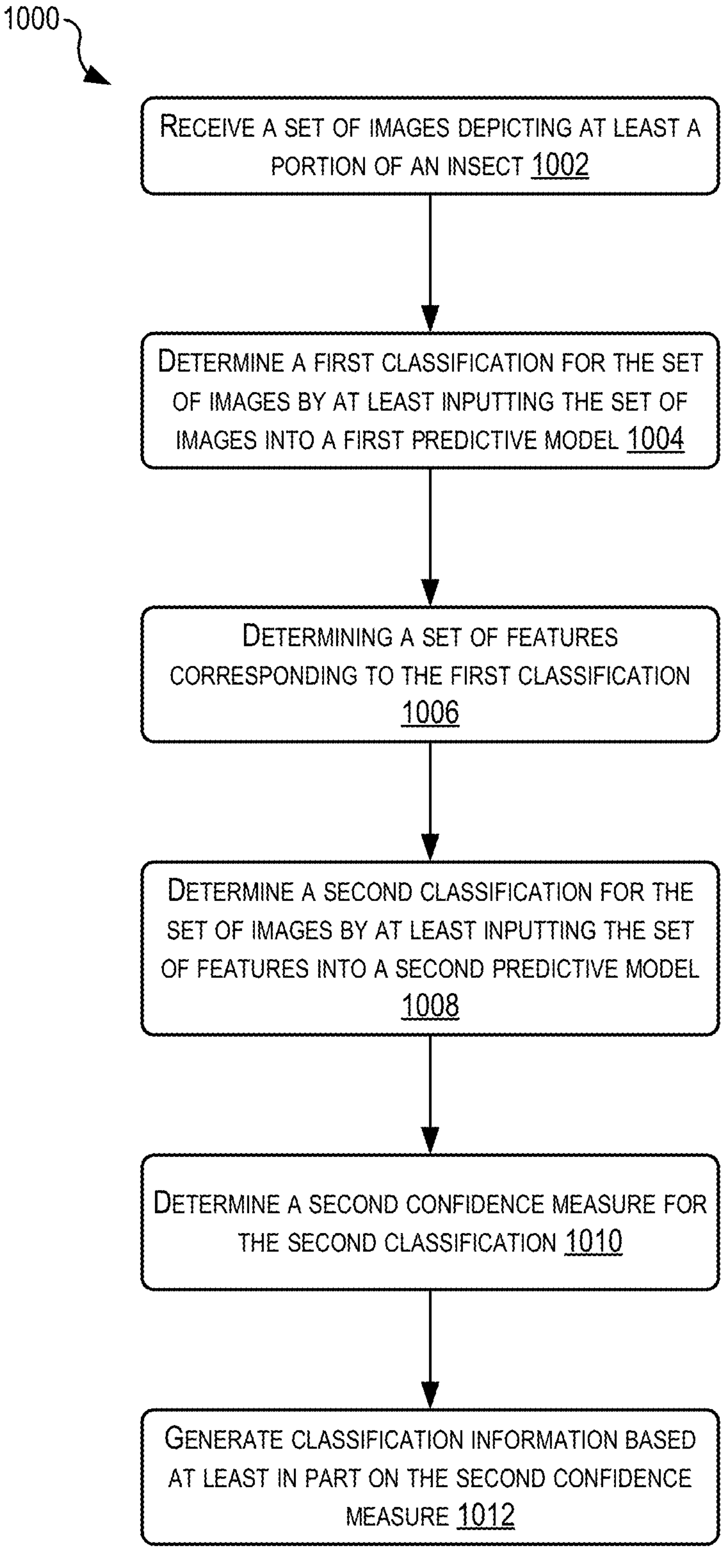
FIG. 10 illustrates an example a flow chart depicting an example process for classifying insects, according to at least one example.

FIG. 10 illustrates an example flow chart depicting the process 1000 for classifying insects, according to at least one example. The process 1000 is performed by the classification module 436 (FIG. 4) executing in the computing device 106 (FIG. 1). The process 1000 in particular corresponds to using two predictive models to classify a set of images.

The process 1000 begins at block 1002 by the computing device 106 receiving a set of images depicting at least a portion of an insect. The image capture component 438 (FIG. 4) may receive the set of images, generally as discussed above with respect to block 602. In some examples, the insect is in an adult stage insect.

At block 1004, the process 1000 includes the computing device 106 determining a first classification for the set of images by least inputting the set of images into a first predictive model. The machine learning classifier 412 (FIG. 4) using the core deep neural network model 440 (FIG. 4) may determine the first classification. Thus, in at least some examples, the first predictive model is the core deep neural network model 440.

At block 1006, the process 1000 includes the computing device 106 determining a set of features corresponding to the first classification. The machine learning classifier 412 may determine the set of features.

At block 1008, the process 1000 includes the computing device 106 determining a second classification for the set of images by at least inputting the set of features into a second predictive model. The machine learning classifier 412 using the recurrent neural network model 442 (FIG. 4) may determine the second classification. Thus, in at least some examples, the second predictive model is the recurrent neural network model 442.

At block 1010, the process 1000 includes the computing device 106 determining a second confidence measure for the second classification. The machine learning classifier 412 may determine the second confidence measure.

At block 1012, the process 1000 includes the computing device 106 generating classification information based at least in part on the second confidence measure. The validation component 446 (FIG. 4) executing in the computing device 106 may generate the classification information. In some examples, the classification information includes a prediction that the insect depicting in the set of images is at least one of a male insect, a female insect, an intersex insect, a number of insects, a species of an insect, or a gynandromorph insect.

In some examples, the process 1000 further includes classifying, using an industrial vision classifier, the set of images prior to determining the first classification. This may be performed by the industrial vision classifier 410 (FIG. 4).

Figure 11:
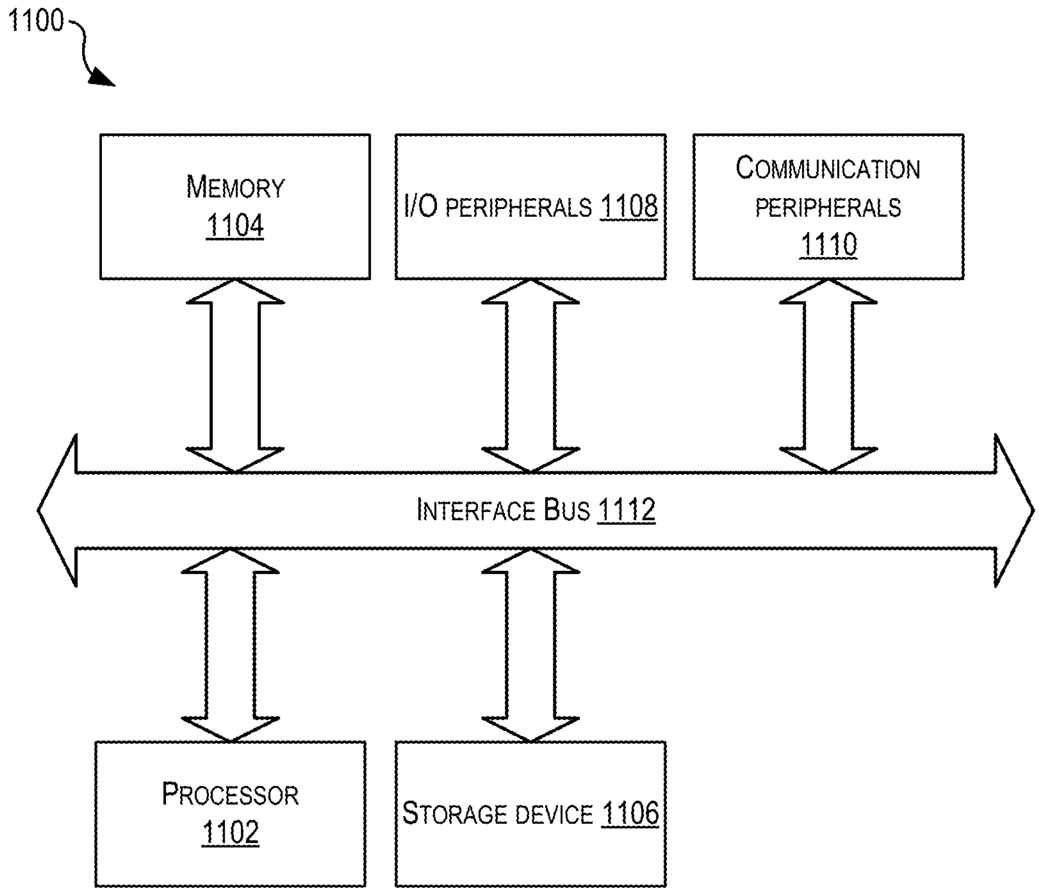
FIG. 11 illustrates an example system for implementing techniques relating to classifying insects, according to at least one example.

FIG. 11 illustrates examples of components of a computer system 1100, according to at least one example. The computer system 1100 may be a single computer such as a user computing device and/or can represent a distributed computing system such as one or more server computing devices. The computer system 1100 is an example of the computing device 106.

The computer system 1100 may include at least a processor 1102, a memory 1104, a storage device 1106, input/ output peripherals (I/O) 1108, communication peripherals 1110, and an interface bus 1112. The interface bus 1112 is configured to communicate, transmit, and transfer data, controls, and commands among the various components of the computer system 1100. The memory 1104 and the storage device 1106 include computer-readable storage media, such as Radom Access Memory (RAM), Read ROM, electrically erasable programmable read-only memory (EE-PROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 1104 and the storage device 1106 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 1100.

Further, the memory 1104 includes an operating system, programs, and applications. The processor 1102 is configured to execute the stored instructions and includes, for example, a logical processing unit, a microprocessor, a digital signal processor, and other processors. The memory 1104 and/or the processor 1102 can be virtualized and can be hosted within another computing system of, for example, a cloud network or a data center. The I/O peripherals 1108 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1108 are connected to the processor 1102 through any of the ports coupled to the interface bus 1112. The communication peripherals 1110 are configured to facilitate communication between the computer system 1100 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. An insect sortation system, comprising:
a pathway having a first end and a second end;
a first outlet extending from the pathway adjacent to the second end;
a second outlet extending from the pathway adjacent to the second end;
a detector disposed adjacent to the pathway and configured to detect one or more characteristics of mosquitos passing by the detector;
a shutter disposed within the pathway between the detector and the second end of the pathway; and
one or more sortation devices configured to direct each mosquito of the mosquitos to at least one of the first outlet or the second outlet after passing by the detector.

2. The insect sortation system of claim 1, wherein the pathway, the first outlet, and the second outlet are configured to form a three-way pathway.

3. The insect sortation system of claim 1, wherein the first outlet and the second outlet are arranged substantially perpendicular to the pathway.

4. The insect sortation system of claim 1, further comprising an air flow system configured to blow air into the pathway at the mosquitos.

5. The insect sortation system of claim 4, where in the air flow system comprises an air source positioned along the pathway for directing air into the pathway to encourage movement of the mosquitos towards the first end or the second end of the pathway.

6. The insect sortation system of claim 1, wherein the one or more sortation devices each comprise an air nozzle.

7. The insect sortation system of claim 1, wherein the shutter is operable between an open position and a closed position for controlling flow of the mosquitos towards the second end of the pathway.

8. The insect sortation system of claim 1, further comprising:
a first sort container attached to a first distal end of the first outlet; and
a second sort container attached to a second distal end of the second outlet.

9. The insect sortation system of claim 1, wherein directing each mosquito of the mosquitos to at least one of the first outlet or the second outlet after passing by the detector is based on the one or more characteristics of mosquitos.

10. A method for sorting insects, comprising:
blowing a first insect from a proximal end of a pathway towards a distal end of the pathway using an air flow system disposed along the pathway, the pathway including a detector disposed adjacent to the pathway;
responsive to the detector detecting the first insect passing a shutter disposed within the pathway between the proximal end and the distal end of the pathway, closing the shutter;
determining a classification for the first insect;
responsive to the determination of the classification for the first insect, opening the shutter;
blowing the first insect towards the distal end of the pathway using the air flow system, wherein a first outlet extends away from the distal end of the pathway and a second outlet extends away from the distal end of the pathway; and
directing movement, using one or more sortation devices, of the first insect to at least one of the first outlet or the second outlet based on the classification for the first insect.

11. The method of claim 10, wherein the detector is configured to detect one or more characteristics of insects passing by the detector.

12. The method of claim 10, wherein the pathway, the first outlet, and the second outlet are configured to form a three-way pathway.

13. The method of claim 10, wherein the first outlet and the second outlet are arranged substantially perpendicular to the pathway.

14. The method of claim 10, wherein the air flow system comprises an air source, an air inlet to the pathway, and a control valve.

15. The method of claim 10, wherein each of the one or more sortation devices comprises an air nozzle.

16. The method of claim 10, wherein the shutter is operable between an open position and a closed position for controlling flow of the first insect towards the distal end of the pathway.

17. An insect sortation system, comprising:
a T-shaped, three-way pathway including:
a pathway, comprising a first end and a second end;
a first outlet end extending perpendicularly away from the second end of the pathway towards a first sort container; and
a second outlet end extending perpendicularly away from the second end of the pathway towards a second sort container;
an imaging device disposed adjacent to the pathway and configured to capture images of mosquitos;
a shutter disposed within the pathway and positioned before the imaging device; and
one or more sortation devices configured to direct the mosquitos to the first outlet end or the second outlet end based on a sex classification of each mosquito.

18. The insect sortation system of claim 17, further comprising an air flow system configured to blow air into the pathway at the mosquitos, comprising an air source positioned along the pathway before or after the shutter, an air inlet to the pathway, and a control valve.

19. The insect sortation system of claim 17, wherein each of the one or more sortation devices comprises an air nozzle.

20. The insect sortation system of claim 17, wherein the shutter is operable between an open position and a closed position for controlling flow of the mosquitos towards the second end of the pathway.

* * * * *